(12) United States Patent
Kim et al.

(10) Patent No.: US 11,360,917 B2
(45) Date of Patent: Jun. 14, 2022

(54) STORAGE DEVICES CONFIGURED TO SUPPORT MULTIPLE HOSTS AND OPERATION METHODS THEREOF

(71) Applicant: Samsung Electronics Co., Ltd., Suwon-si (KR)

(72) Inventors: Youngwook Kim, Hwaseong-si (KR); Jinwoo Kim, Seoul (KR); Myung Hyun Jo, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/124,899

(22) Filed: Dec. 17, 2020

(65) Prior Publication Data

US 2021/0255971 A1    Aug. 19, 2021

(30) Foreign Application Priority Data

Feb. 18, 2020  (KR) .......................... 10-2020-0019883

(51) Int. Cl.
*G06F 13/16* (2006.01)
*G06F 3/06* (2006.01)
*G06F 13/42* (2006.01)

(52) U.S. Cl.
CPC ........ *G06F 13/1668* (2013.01); *G06F 3/0611* (2013.01); *G06F 3/0659* (2013.01);
(Continued)

(58) Field of Classification Search
CPC ............. G06F 3/06; G06F 3/061; H04L 12/56
See application file for complete search history.

(56) References Cited

U.S. PATENT DOCUMENTS 7,356,631 B2   4/2008  Lin
8,307,135 B2  11/2012  Zohar et al.
(Continued)

FOREIGN PATENT DOCUMENTS

JP          H06119282 A    4/1994
KR    10-2016-0016557 A    2/2016

OTHER PUBLICATIONS

"Ethernet physical layer", Wikipedia, https://en.wikipedia.org/Ethernet_physical_layer#Physical_layers, pp. 1-22 (retrieved Jun. 17, 2020).
(Continued)

*Primary Examiner* — Getente A Yimer
(74) *Attorney, Agent, or Firm* — Harness, Dickey & Pierce, P.L.C.

(57) ABSTRACT

An operation method of a storage device configured to implement physical functions respectively corresponding to hosts includes receiving performance information from each of the host devices, setting a performance level of each of the physical functions to a first level, processing a command from a first host through a corresponding first physical function, changing a performance level of the first physical function to a second level based on the performance information and a performance serviced to the first host, and processing a second command from a second host through at least one second physical function corresponding to the second host prior to processing a subsequent first command from the first host, through the first physical function, based on a performance level of the at least one second physical function being the first level and the performance level of the first physical function being the second level.

20 Claims, 19 Drawing Sheets

(52) U.S. Cl.
CPC ........ *G06F 3/0679* (2013.01); *G06F 13/4282* (2013.01); *G06F 2213/0026* (2013.01)

(56) References Cited

U.S. PATENT DOCUMENTS

| | | | |
|---|---|---|---|
| 9,026,765 B1 * | 5/2015 | Marshak | G06F 12/0866 |
| | | | 711/170 |
| 10,157,023 B2 | 12/2018 | Moon et al. | |
| 10,203,912 B2 | 2/2019 | Jun et al. | |
| 2008/0049775 A1 * | 2/2008 | Morrill | H04L 41/5003 |
| | | | 370/419 |
| 2012/0233386 A1 | 9/2012 | Tong et al. | |
| 2013/0151755 A1 * | 6/2013 | Elhamias | G06F 3/0634 |
| | | | 711/103 |
| 2015/0301744 A1 * | 10/2015 | Kim | G06F 3/0679 |
| | | | 711/103 |
| 2018/0081588 A1 * | 3/2018 | Lee | G06F 3/0619 |

OTHER PUBLICATIONS

Ana Klimovic, et al., "ReFlex: Remote Flash = Local Flash", ASPLOS '17, DOI: http://dx.doi.org/10.1145/3037697.3037732, 2017, pp. 345-359.

Byunghei Jun, et al., "Workload-Aware Budget Compensation Scheduling for NVMe Solid State Drives", IEEE, 2015.

* cited by examiner

FIG. 12

| Tenant or PF | Minimum Performance ||||  Maximum Performance ||||
|---|---|---|---|---|---|---|---|---|
| | Seq.Write Bandwidth | Seq.Read Bandwidth | Ran.Write IOPS | Ran.Read IOPS | Seq.Write Bandwidth | Seq.Read Bandwidth | Ran.Write IOPS | Ran.Read IOPS |
| PF1 | SW_min1 | SR_min1 | RW_min1 | RR_min1 | SW_max1 | SR_max1 | RW_max1 | RR_max1 |
| PF2 | SW_min2 | SR_min2 | RW_min2 | RR_min2 | SW_max2 | SR_max2 | RW_max2 | RR_max2 |
| PF3 | SW_min3 | SR_min3 | RW_min3 | RR_min3 | SW_max3 | SR_max3 | RW_max3 | RR_max3 |

STORAGE DEVICES CONFIGURED TO SUPPORT MULTIPLE HOSTS AND OPERATION METHODS THEREOF

CROSS-REFERENCE TO RELATED APPLICATION

This application claims priority under 35 U.S.C. § 119 to Korean Patent Application No. 10-2020-0019883 filed on Feb. 18, 2020, in the Korean Intellectual Property Office, the disclosures of which are incorporated by reference herein in their entireties.

BACKGROUND

Some example embodiments of the inventive concepts described herein relate to storage devices, and more particularly, relate to storage devices configured to support multiple hosts, and/or operation methods thereof.

A semiconductor memory device is classified as a volatile memory device, in which stored data disappear in the semiconductor memory device when a power supply to the semiconductor memory device is turned off, such as a static random access memory (SRAM) or a dynamic random access memory (DRAM), or a nonvolatile memory device, in which stored data are retained in the semiconductor memory device even when a power supply to the semiconductor memory device is turned off, such as a flash memory device, a phase-change RAM (PRAM), a magnetic RAM (MRAM), a resistive RAM (RRAM), or a ferroelectric RAM (FRAM).

Flash memory based high-capacity storage media communicate with an external device by using a high-speed interface. Nowadays, a multi-host storage system in which a single storage medium supports a plurality of hosts or a plurality of tenants is being developed.

SUMMARY

Some example embodiments of the inventive concepts provide a storage device capable of improving an overall performance of a storage system by securing at least a minimum performance of each of a plurality of hosts or limiting the maximum performance thereof, and/or operation methods thereof. In some example embodiments, in the case where a plurality of hosts access a single storage medium, a performance of each of the plurality of hosts may be improved or optimized based on avoiding exhaustion of a limited physical resource of the single storage medium, based on reducing the likelihood of over-use of the limited physical resource by any one of the hosts while ensuring that at least a minimum performance of each host is satisfied.

According to some example embodiments, a method of operation of a storage device, the storage device configured to implement a plurality of physical functions respectively corresponding to a plurality of host devices, may include receiving performance information from each of the plurality of host devices, setting a performance level of each of the plurality of physical functions to a first level, processing at least one command from at least a first host device of the plurality of host devices through at least a first physical function of the plurality of physical functions, the first host device corresponding to the first physical function, changing a performance level of the first physical function to a second level based on performance information associated with the first host device and a performance serviced to the first host device based on processing the at least one command from at least the first host device through at least the first physical function, and processing a second command from at least one second host device of the plurality of host devices through at least one second physical function of the plurality of physical functions prior to processing a subsequent first command from the first host device through the first physical function, based on a performance level of the at least one second physical function being the first level and the performance level of the first physical function being the second level, wherein the at least one second host device corresponds to the at least one second physical function.

According to some example embodiments, a storage device may include a nonvolatile memory device, and storage control circuitry configured to control the nonvolatile memory device under control of a first host device and a second host device. The storage control circuitry may include a first nonvolatile memory express (NVMe) controller circuitry configured to process a first command from a first submission queue of the first host device, a second NVMe controller circuitry configured to process a second command from a second submission queue of the second host device, and processing circuitry. The processing circuitry may be configured to perform command scheduling on the first and second commands based on a performance level of each of the first and second NVMe controller circuitries, and adjust the performance level of each of the first and second NVMe controller circuitries based on performance information received from the first and second host devices and performances serviced to the first and second host devices respectively through the first and second NVMe controller circuitries.

According to some example embodiments, an operation method of a storage device, which is configured to communicate with a plurality of host devices, may include receiving performance information from the plurality of host devices, performing command scheduling on one or more commands from one or more host devices of the plurality of host devices, monitoring performances respectively serviced to the one or more host devices of the plurality of host devices, the performances being serviced based on performing the command scheduling, and performing subsequent command scheduling on a first command from at least one first host device from the plurality of host devices and a second command from at least one second host device from the plurality of host devices such that the first command is processed prior to the second command being processed, based on the monitored performances and the performance information.

BRIEF DESCRIPTION OF THE DRAWINGS

The above and other objects and features of the inventive concepts will become apparent by describing in detail some example embodiments thereof with reference to the accompanying drawings.

FIG. 12 is a diagram for describing a configuration to receive performance information of FIG. 4.

DETAILED DESCRIPTION

Below, some example embodiments of the inventive concepts may be described in detail and clearly to such an extent that an ordinary one in the art easily implements the inventive concepts.

Figure 1:
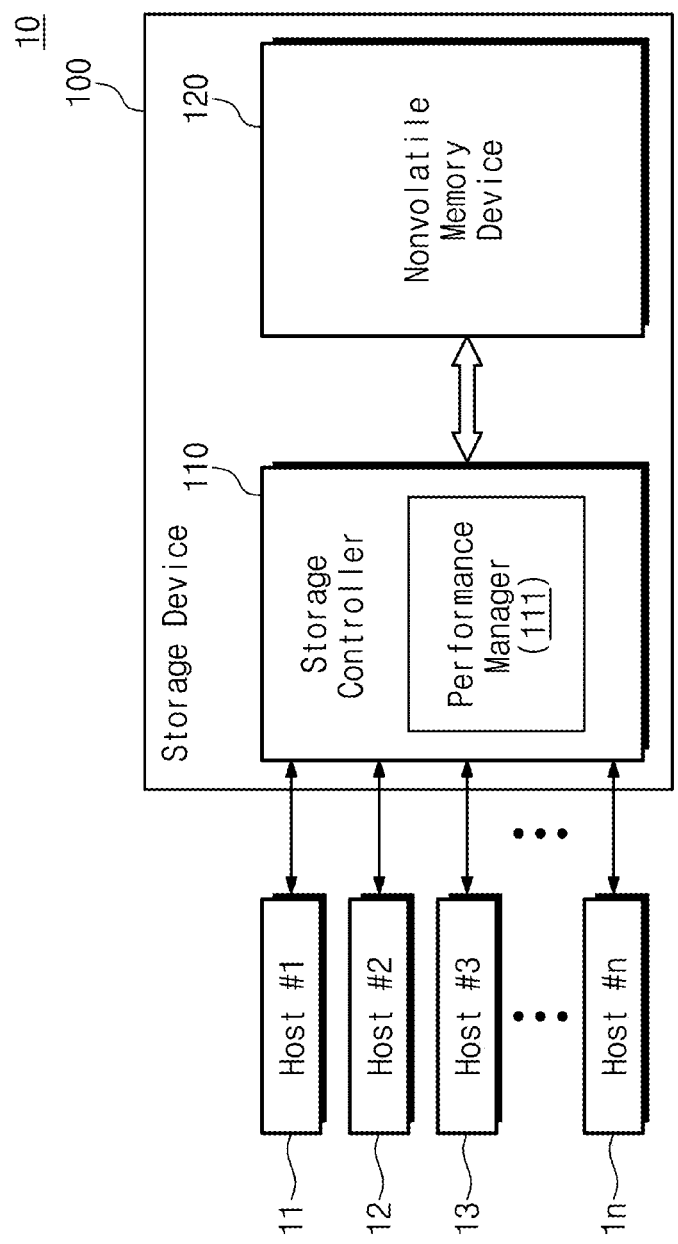
FIG. 1 is a block diagram illustrating a storage system according to some example embodiments of the inventive concepts.

FIG. 1 is a block diagram illustrating a storage system according to some example embodiments of the inventive concepts. Referring to FIG. 1, a storage system 10 may include a plurality of hosts 11 to 1n (also referred to herein as host devices) and a storage device 100 communicatively coupled thereto. In some example embodiments, the storage system 10 may include at least one of various information processing devices (e.g., computing devices) such as a personal computer, a laptop computer, a server, a workstation, a smartphone, and/or a tablet PC.

Each of the plurality of hosts 11 to 1n may be configured to access the storage device 100 as part of performing one or more operations. In some example embodiments, the plurality of hosts 11 to 1n may be computing nodes (e.g., computing devices) configured to operate independently of each other. In some example embodiments, each of the plurality of hosts 11 to 1n may be a single core processor (e.g., single core processing circuitry) or a multi-core processor (e.g., multi-core processing circuitry) included in the corresponding computing node (e.g., computing device), or a computing system. In some example embodiments, at least some of the plurality of hosts 11 to 1n may be different processors included in the same computing node (e.g., computing device), or computing system. In some example embodiments, the plurality of hosts 11 to 1n may be processors configured to process different applications.

The storage device 100 may operate under control of each of the plurality of hosts 11 to 1n. For example, the storage device 100 may include a storage controller 110 (also referred to herein interchangeably as storage control circuitry) and a nonvolatile memory device 120. The storage controller 110 may be configured to control the nonvolatile memory device 120 under control of any of the plurality of hosts 11 to 1n, including each of the plurality of hosts 11 to 1n. Under control of each of the plurality of hosts 11 to 1n, the storage controller 110 may store data in the nonvolatile memory device 120 or may provide data stored in the nonvolatile memory device 120 to each of the plurality of hosts 11 to 1n. Such storing and/or providing may at least partially enable performance of the plurality of hosts 11 to 1n and may be referred to as servicing performance of the plurality of hosts 11 to 1n. In some example embodiments, the plurality of hosts 11 to 1n and the storage device 100 may communicate with each other based on a PCI-express (Peripheral Component Interconnect express) interface or a PCI-express based NVMe (Nonvolatile Memory Express) interface. An interface between the plurality of hosts 11 to 1n and the storage device 100 and a structural characteristic of the interface will be described with reference to drawings below.

The storage controller 110 and/or any portions thereof (e.g., performance manager 111) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (SSD), or the like, storing a program of instructions, and a processor configured to execute the program of instructions to implement the functionality of and/or methods performed by some or all of the storage controller 110 and/or any portions thereof (e.g., performance manager 111).

In some example embodiments, the storage device 100 may be a storage device or a single storage device configured to support multiple-hosts or multiple-tenants. Each of the plurality of hosts 11 to 1n configured to access the storage device 100 independently of each other may require a specific performance (e.g., a specific number (e.g., quantity) of commands processed per unit time and/or a specific size of inputs/outputs processed per unit time with regard to the given host based on processing one or more commands from the given host device through the corresponding physical function PF) depending on a type or an operation manner for the purpose of accessing the storage device 100. However, due to a limitation on a physical resource of the storage device 100 (e.g., storage capacity), the storage device 100 may fail to support the specific performance of each of the plurality of hosts 11 to 1n, under a specific condition (e.g., in the case where a specific host of the plurality of hosts 11 to 1n occupies all or most of the physical resource (e.g., storage capacity) of the storage device 100).

The storage device 100 according to some example embodiments of the inventive concepts may secure (e.g., enable, implement, etc.) a reduced or minimum performance of each of the plurality of hosts 11 to 1n. For example, the storage controller 110 of the storage device 100 may include a performance manager 111, also referred to herein interchangeably as performance manager circuitry. The performance manager 111 may be configured to set a level of performance of each of the plurality of hosts 11 to 1n and may schedule commands respectively corresponding to the plurality of hosts 11 to 1n. In some example embodiments, the level (e.g., performance level) of each of the plurality of hosts 11 to 1n may be set based on performance information (e.g., a minimum performance or a maximum performance) of each of the plurality of hosts 11 to 1n and the throughput of the plurality of hosts 11 to 1n. Each separate performance level, also referred to herein as a "level," may indicate a level of performance that a corresponding host and/or physical function is to operate at (e.g., one level may indicate a maximum performance level of a physical function PF and/or host set to that one level, and another level may indicate a minimum performance level of a physical function PF and/or host set to that other level). The performance manager 111 according to some example embodiments of the inventive concepts may satisfy performance requirements of the plurality of hosts 11 to 1n by scheduling commands based on the set levels (e.g., performance levels) of the respective hosts 11 to 1n. Accordingly, performance of the storage system 10, hosts 11 to 1n, and/or storage device 100 may be improved based on ensuring that at least a minimum performance may be serviced to each of the hosts 11 to 1n without overwhelming the limited physical resource provided by the nonvolatile memory device 120. An operation and a configuration of the performance manager 111 will be more fully described with reference to drawings below.

Figure 2:
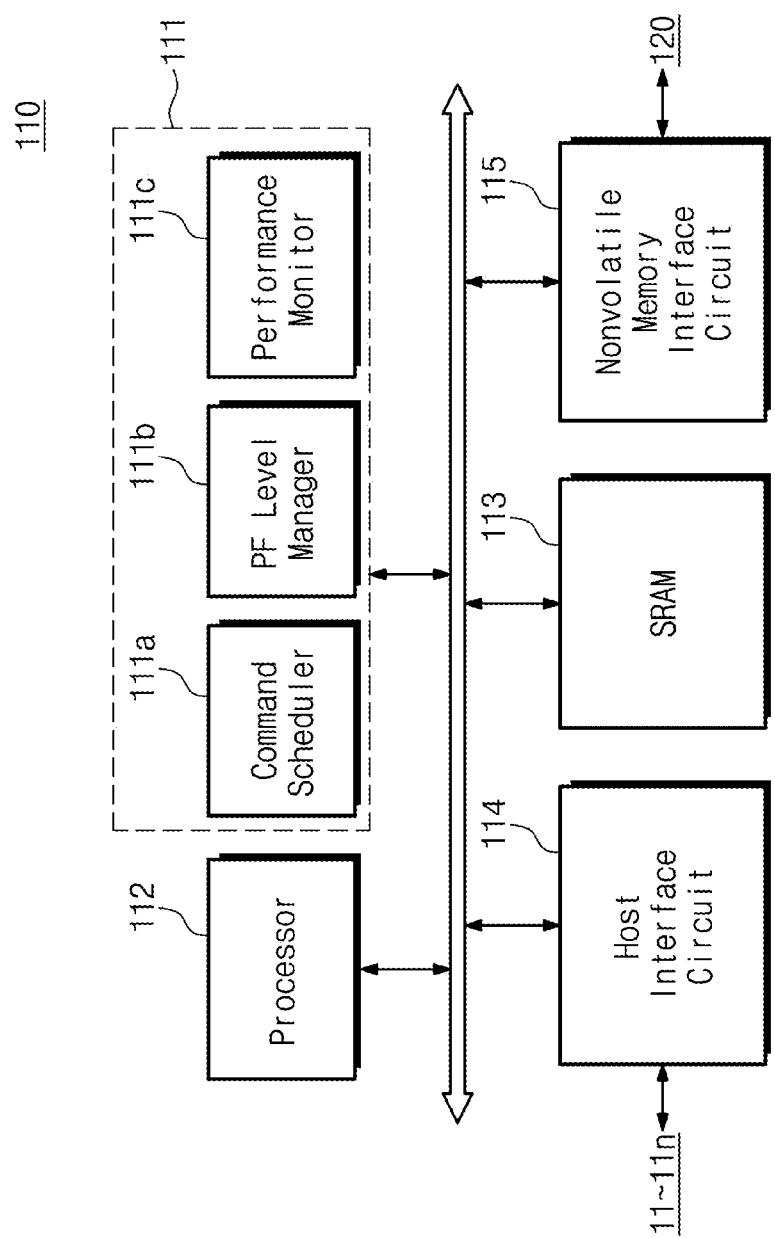
FIG. 2 is a block diagram illustrating a storage controller of FIG. 1.

FIG. 2 is a block diagram illustrating a storage controller 110 of FIG. 1. Referring to FIGS. 1 and 2, the storage controller 110 may include the performance manager 111, a processor 112, an SRAM 113, a host interface circuit 114, and a nonvolatile memory interface circuit 115.

The performance manager 111 may be configured to manage the performance (e.g., operation) of each of the plurality of hosts 11 to 1n by scheduling commands of the plurality of hosts 11 to 1n. For example, the performance manager 111 may include a command scheduler 111a, a performance level manager 111b, and a performance monitor 111c.

The performance manager 111 and/or any portions thereof (e.g., command scheduler 111a, performance level manager 111b, and/or performance monitor 111c) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (SSD), SRAM 113, or the like, storing a program of instructions, and a processor (e.g., processor 112) configured to execute the program of instructions to implement the functionality of and/or methods performed by some or all of the performance manager 111 and/or any portions thereof (e.g., command scheduler 111a, performance level manager 111b, and/or performance monitor 111c).

The command scheduler 111a may be configured to schedule commands from the plurality of hosts 11 to 1n (e.g., schedule the implementation of operations according to said commands). For example, the command scheduler 111a may be configured to schedule commands from the respective hosts 11 to 1n based on levels of a plurality of physical functions set by the performance level manager 111b.

The performance level manager 111b may be configured to set a level (e.g., performance level) of a physical function PF, implemented by the storage device 100, corresponding to one or more hosts of the plurality of hosts 11 to 1n. For example, the performance level manager 111b may set a performance level of each of the plurality of hosts 11 to 1n, and/or a performance level of each of the plurality of physical functions PF corresponding to separate, respective hosts of the plurality of hosts 11 to 1n, thereby setting the level of performance of the hosts and/or physical functions PF (e.g., maximum performance, minimum performance, etc.). The performance level manager 111b may be configured to set a level of each physical function PF based on performance information from one or more (e.g., each) of the plurality of hosts 11 to 1n and a performance monitored by the performance monitor 111c. In some example embodiments, the physical function PF may be a hardware or software component configured to provide a function defined by the NVMe interface standard. In some example embodiments, the physical function PF may be an NVMe controller (also referred to herein as an NVMe controller device, NVMe controller circuitry, or the like) configured to support a single PCI-express function.

In some example embodiments, the physical function PF may be a PCI-express function supporting a single root I/O virtualization (SR-IOV) function configured to allow the physical function PF to support one or more dependent virtual functions. Below, it is assumed that the physical function PF is an NVMe controller corresponding to at least one of the plurality of hosts 11 to 1n, but the inventive concepts are not limited thereto. Also, for convenience of description, the term "physical function PF" may be used, but the physical function PF may be interchangeable with a configuration or a term of the NVMe controller. Accordingly, as described herein, a physical function PF that is "implemented by" the storage device 100 may include a hardware component physical function PF that is included in the storage device 100 (e.g., a physical function PF device) and/or a software component physical function PF that is implemented by processing circuitry (e.g., processor 112) of the storage device 100 (e.g., based on said processing circuitry executing a program of instructions stored in a memory (e.g., SRAM 113). Accordingly, it will be understood that the storage device 100 may be configured to implement a plurality of physical functions PF that correspond to separate, respective hosts of the plurality of hosts 11 to 1n. A configuration of the physical function PF will be more fully described with reference to FIGS. 3A to 3C.

The performance monitor 111c may detect a performance serviced from the storage device 100 to each of the plurality of hosts 11 to 1n by monitoring commands processed at the storage device 100.

In some example embodiments, in the case where a performance (e.g., operation) serviced to at least one of the plurality of hosts 11 to 1n satisfies minimum performance of the at least one host (e.g., minimum operational performance of the at least one host), the performance level manager 111b may change a level (e.g., performance level) of the corresponding physical function PF (e.g., may decrease a level). In the case where a performance serviced to at least one of the plurality of hosts 11 to 1n exceeds maximum performance (e.g., maximum operational performance of the at least one host), the performance level manager 111b may change a level (e.g., performance level) of the corresponding physical function PF, such that the corresponding physical function PF is disabled. The above operation of the performance manager 111 will be more fully described with reference to drawings below.

The processor 112 may control overall operations of the storage controller 110. For example, the processor 112 may be configured to execute various applications (e.g., a flash translation layer (FTL)) on the storage controller 110. The SRAM 113 may be used as a buffer memory, a working memory, or a cache memory of the storage controller 110. In some example embodiments, the performance manager 111 may be implemented in the form of software, hardware, or a combination thereof. In the case where the performance manager 111 is implemented in the form of software, the performance manager 111 may be stored in the SRAM 113 in the form of a program of instructions, and the performance manager 111 stored in the SRAM 113 may be executed by the processor 112, e.g., based on the processor 112 executing the program of instructions stored in the SRAM 113.

The host interface circuit 114 may communicate with the plurality of hosts 11 to 1n in compliance with a given communication protocol. In some example embodiments, the given interface protocol may include at least one of various host interfaces such as a PCI-express (Peripheral Component Interconnect express) interface, an NVMe (nonvolatile memory express) interface, a SATA (Serial ATA) interface, a SAS (Serial Attached SCSI) interface, and a UFS (Universal Flash Storage) interface, but the inventive concepts are not limited thereto. To describe the technical idea of the inventive concepts easily, below, it is assumed that the host interface circuit 114 is implemented on an NVMe interface basis. That is, the host interface circuit 114 may communicate with each of the plurality of hosts 11 to 1n through a PCI-express interface based physical layer and may process information received from the plurality of hosts 11 to 1n through the NVMe interface based NVMe controller. In some example embodiments, the NVMe controller may be included in the host interface circuit 114, and the NVMe controller may correspond to the plurality of hosts 11 to 1n.

In some example embodiments, in the case where the performance manager 111 is implemented in the form of hardware, the performance manager 111 may be included in the host interface circuit 114 or may be included in an NVMe controller of the host interface circuit 114.

The storage controller 110 may communicate with the nonvolatile memory device 120 through the nonvolatile memory interface circuit 115. In some example embodiments, the nonvolatile memory interface circuit 115 may be a NAND interface, and the NAND interface may support a multi-way/multi-channel of a plurality of nonvolatile memories included in the nonvolatile memory device 120.

Figure 3A:
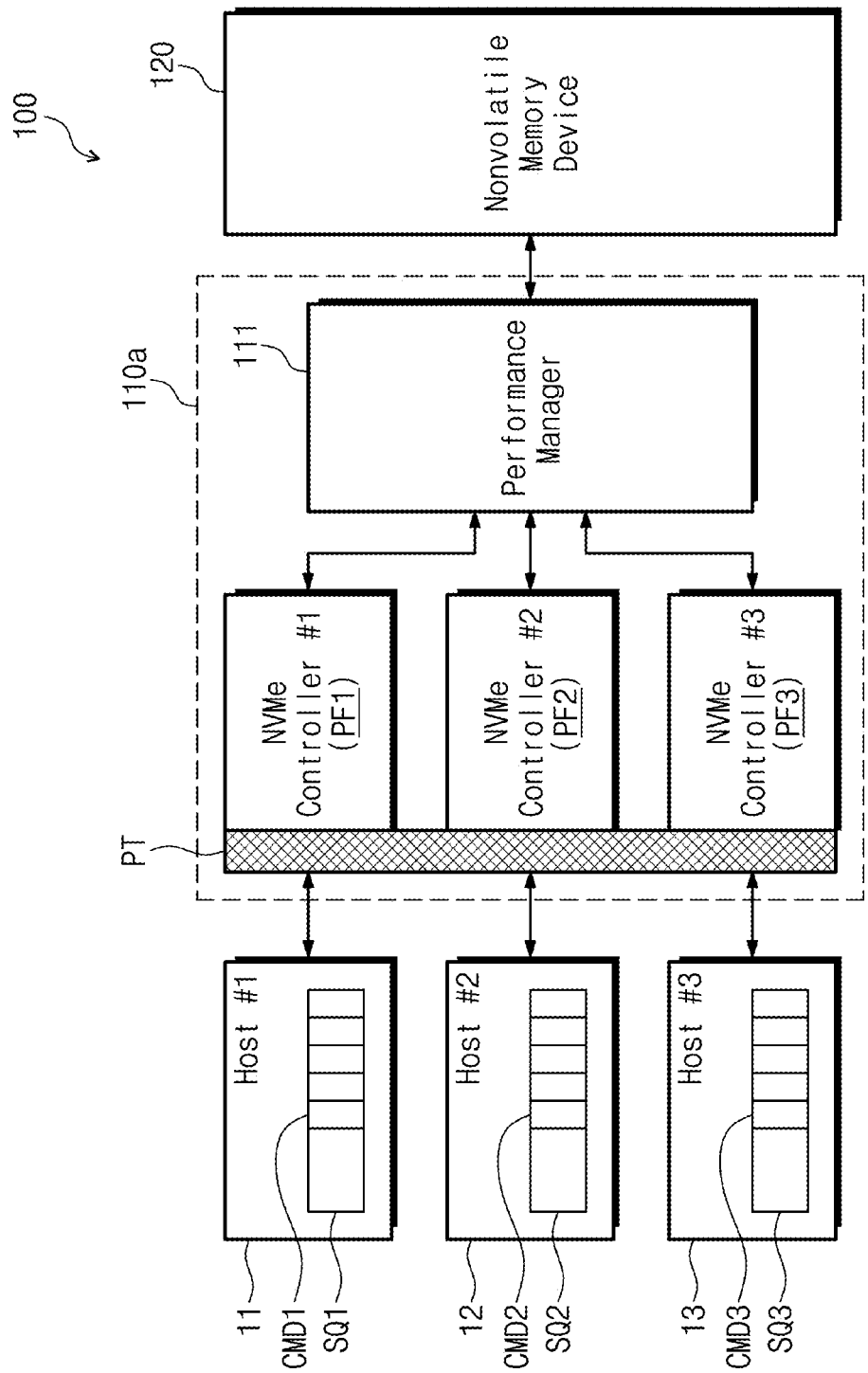
FIGS. 3A, 3B, and 3C are diagrams for describing a physical function of a storage device of FIG. 1.
Figure 3B:
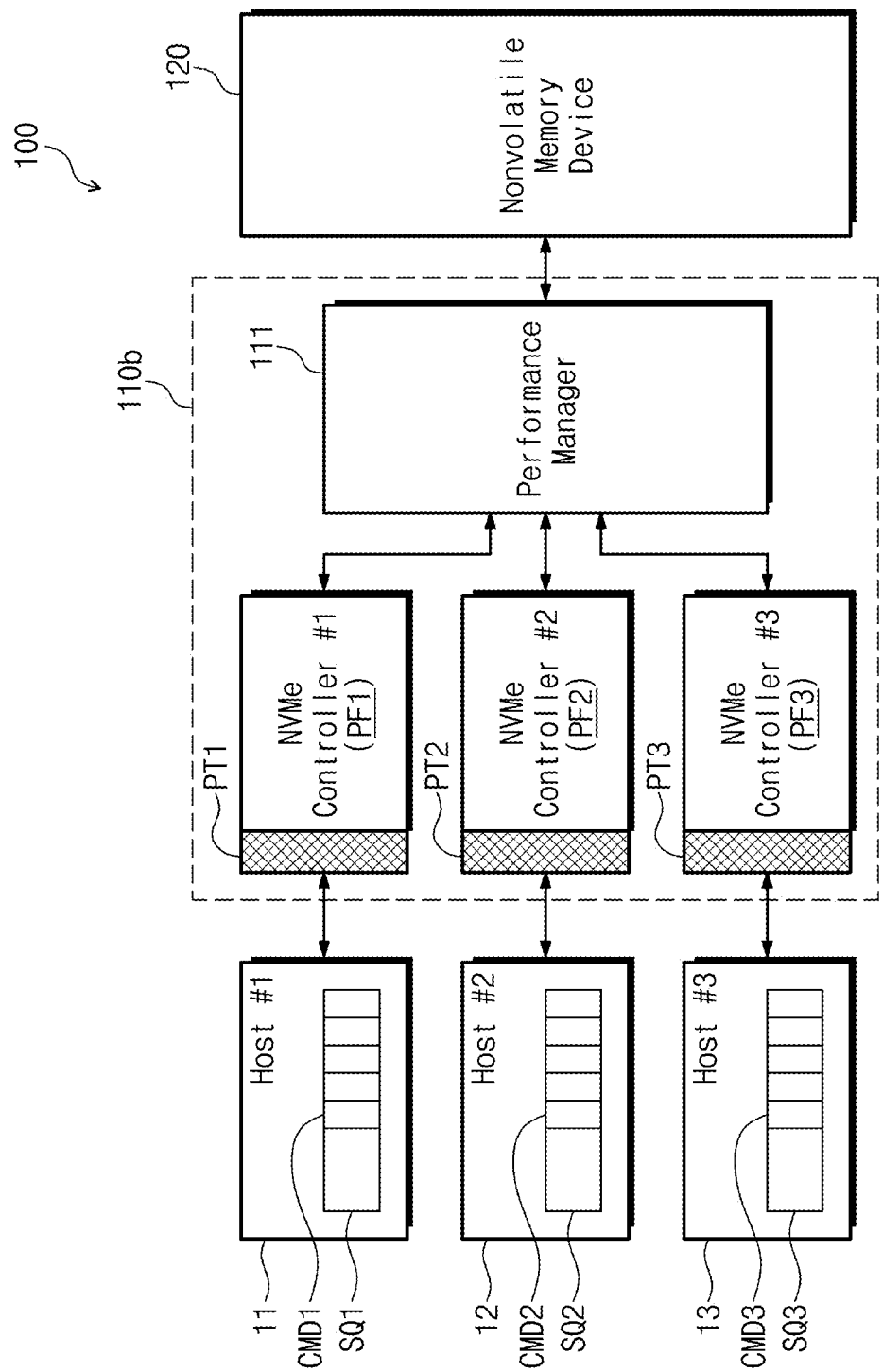
Figure 3C:
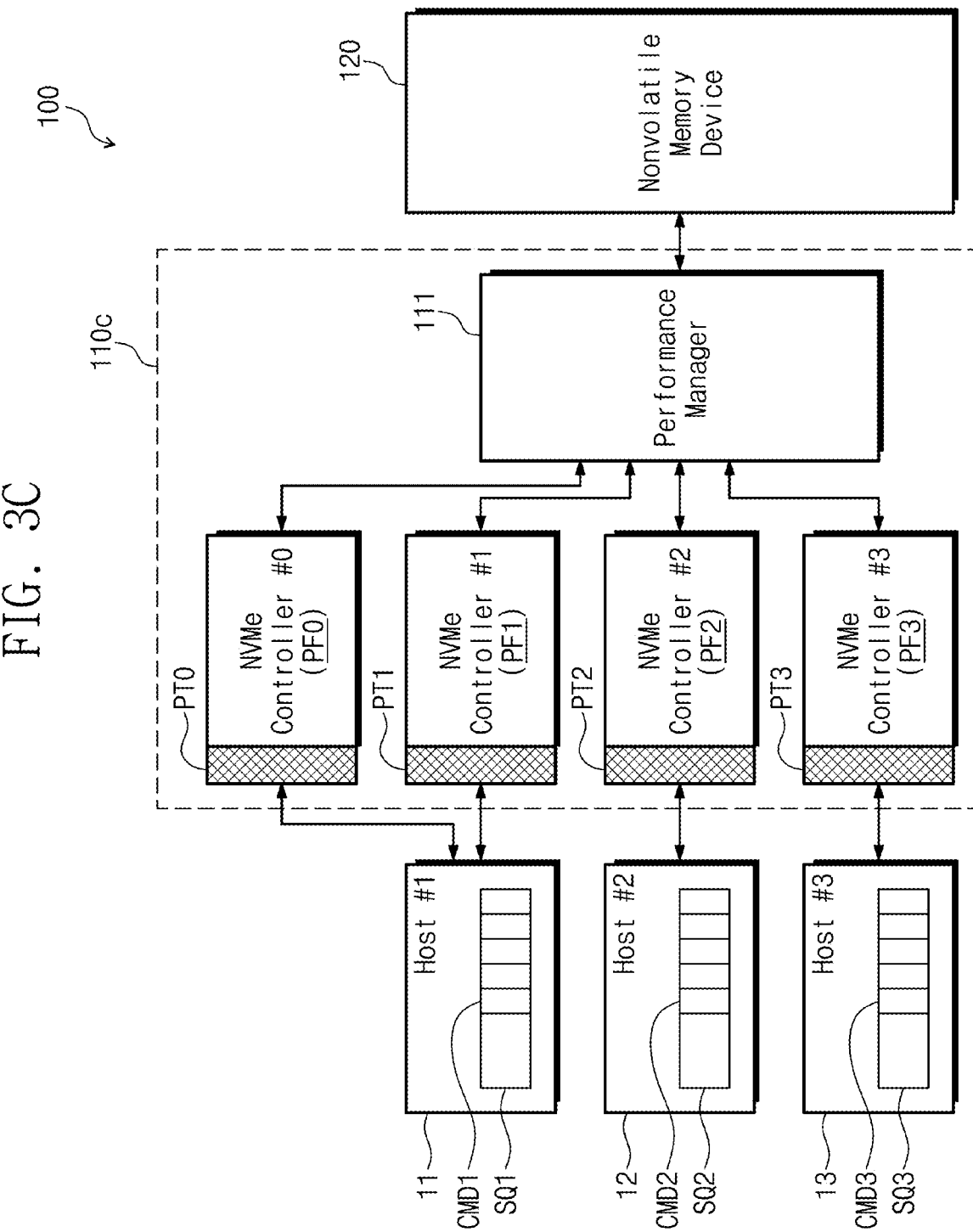

FIGS. 3A, 3B, and 3C are diagrams for describing a physical function of a storage device of FIG. 1. For brevity of illustration and convenience of description, below, components that are unnecessary to describe a configuration, a structure, and a function of the physical function PF will be omitted.

Below, the term "physical function PF" is used to describe the technical idea of the inventive concepts easily. The physical function PF may refer to an NVMe controller corresponding to each of the plurality of hosts 11 to 1n. The NVMe controller may be implemented in the form of software, hardware, or a combination thereof. In some example embodiments, the physical function PF may indicate a PCI-express function configured to support the SR-IOV function. The SR-IOV may indicate a function that allows one physical function to support one or more dependent virtualization functions. That is, below, the physical function PF may correspond to at least one of the plurality of hosts 11 to 1n and may be understood as being configured to process a command of the corresponding host of the plurality of hosts 11 to 1n or a command of a submission queue managed by the corresponding host. Accordingly, as described herein, a physical function PF that is "implemented by" the storage device 100 may include a hardware component physical function PF that is included in the storage device 100 and/or a software component physical function PF that is implemented by processing circuitry (e.g., processor 112) of the storage device 100 (e.g., based on said processing circuitry executing a program of instructions stored in a memory (e.g., SRAM 113). A physical function PF that includes a hardware component physical function PF may be referred to herein as a "physical function device." Accordingly, it will be understood that the storage device 100 may be configured to implement a plurality of physical functions PF that correspond to separate, respective hosts of the plurality of hosts 11 to 1n. For convenience of description, below, it is assumed that the storage device 100 communicates with three hosts 11, 12, and 13, but the inventive concepts are not limited thereto.

Referring to FIGS. 1 to 3C, the first to third hosts 11 to 13 may issue commands CMD1 to CMD3 for processing corresponding operations, respectively. For example, the first host 11 may issue the first command CMD1, and the first command CMD1 thus issued may be queued in a first submission queue SQL The second host 12 may issue the second command CMD2, and the second command CMD2 thus issued may be queued in a second submission queue SQ2. The third host 13 may issue the third command CMD3, and the third command CMD3 thus issued may be queued in a third submission queue SQ3.

Some example embodiments are illustrated in FIG. 3A as each of the first to third hosts 11 to 13 manages one, separate submission queue, but the inventive concepts are not limited thereto. For example, each of the first to third hosts 11 to 13 may manage a plurality of submission queues. In some example embodiments, each of the first to third hosts 11 to 13 may further manage a completion queue configured to receive completions associated with a plurality of submission queues. In some example embodiments, each of the first to third hosts 11 to 13 may issue an administrative command and may further manage an admin queue and an admin completion queue configured to receive a completion associated with an administrative command. In some example embodiments, the submission queue, the completion queue, the admin queue, the admin completion queue, etc. may be included in (e.g., implemented by) a controller memory buffer (CMB) (e.g., the SRAM 113 or a separate memory buffer (not illustrated)) of the storage device 100. In some example embodiments, the submission queue, the completion queue, the admin queue, the admin completion queue, etc. may be included in a host memory buffer (HMB) of a corresponding host.

The storage device 100 may communicate with the first to third hosts 11 to 13. In some example embodiments, the storage device 100 may communicate with the first to third hosts 11 to 13 through an interface (e.g., NVMe over PCI-express) belonging to a physical layer of the PCI-express interface. In some example embodiments, the storage device 100 may communicate with the first to third hosts 11 to 13 through a network based interface (e.g., NVMe-oF: NVMe over Fabrics) such as a fibre channel or a remote direct random access memory (RDMA). Below, to describe some example embodiments of the inventive concepts clearly, it is assumed that the storage controller 110 communicates with the first to third hosts 11 to 13 through the NVMe over PCI-express interface.

The storage device 100 may communicate with the first to third hosts 11 to 13 through various types of physical layers. First to third physical functions PF1 to PF3 implemented by the storage device 100 may respectively correspond to the first to third hosts 11 to 13 (e.g., may correspond to separate, respective hosts of the first to third hosts 11 to 13). For example, the first physical function PF1 may indicate a first NVMe controller configured to communicate with the first host 11 and to process the first command CMD1 from the first host 11. The second physical function PF2 may indicate a second NVMe controller configured to communicate with the second host 12 and to process the second command CMD2 from the second host 12. The third physical function PF3 may indicate a third NVMe controller configured to communicate with the third host 13 and to process the third command CMD3 from the third host 13.

Each of the first to third physical functions PF1 to PF3 may perform an operation of the nonvolatile memory device 120 based on a command from the corresponding host, thereby servicing a performance of the corresponding host. In some example embodiments, the nonvolatile memory device 120 may be managed by using a logically divided namespace NS or a physically or logically divided nonvolatile memory (NVM) set. Each of the first to third physical functions PF1 to PF3 may perform an operation corresponding to a command with respect to a corresponding namespace or a corresponding NVM set.

The performance manager 111 may control operations of the first to third physical functions PF1 to PF3 based on levels of the first to third physical functions PF1 to PF3. For example, the performance manager 111 may schedule physical functions, which will process a command, from among the first to third physical functions PF1 to PF3 based on the levels of the first to third physical functions PF1 to PF3.

In some example embodiments, as illustrated in FIG. 3A, the first to third physical functions PF1 to PF3 may communicate with the first to third hosts 11 to 13 through one physical port PT. That is, as illustrated in FIG. 3A, a storage controller 110a may include one physical port PT, the first to third physical functions PF1 to PF3, and the performance manager 111. The first to third physical functions PF1 to PF3 may communicate with the first to third hosts 11 to 13 through one physical port PT. The physical port PT may be a physical layer configured to support the PCI-express interface. In some example embodiments, each of the first to third physical functions PF1 to PF3 may support dependent virtual functions. In some example embodiments, at least one of the first to third physical functions PF1 to PF3 may be a dependent virtual function.

In some example embodiments, as illustrated in FIG. 3B, the first to third physical functions PF1 to PF3 may communicate with the first to third hosts 11 to 13 through a plurality of physical ports PT1 to PT3. For example, as illustrated in FIG. 3B, a storage controller 110b may include the first to third physical ports PT1 to PT3, the first to third physical functions PF1 to PF3, and the performance manager 111. Each of the first to third physical ports PT1 to PT3 may be an independent physical layer configured to support the PCI-express interface. The first physical function PF1 may communicate with the first host 11 through the first physical port PT1, the second physical function PF2 may communicate with the second host 12 through the second physical port PT2, and the third physical function PF3 may communicate with the third host 13 through the third physical port PT3.

In some example embodiments, as illustrated in FIG. 3C, at least one host (e.g., the first host 11) of the first to third hosts 11 to 13 may communicate with at least two physical functions. For example, as illustrated in FIG. 3C, a storage controller 110c may include 0-th to third physical ports PT0 to PT3, 0-th to third physical functions PF0 to PF3, and the performance manager 111. The first host 11 may communicate with the 0-th physical function PF0 through the 0-th physical port PT0 and may communicate with the first physical function PF1 through the first physical port PT1. That is, one host may communicate with at least two physical functions.

The communication between the storage device 100 and the hosts 11 to 13 and the configuration of the physical function PF, which are described with reference to FIGS. 3A to 3C, are examples, and the inventive concepts are not limited thereto. As described above, a plurality of physical functions PF may indicate NVMe controllers respectively corresponding to a plurality of hosts (e.g., corresponding to separate, respective hosts of the plurality of hosts), and the plurality of physical functions PF may be configured to communicate with the corresponding hosts through one (e.g., a same) physical port or through individual (e.g., separate, respective) physical ports. That is, below, it may be understood that one physical function PF corresponds to one separate host.

Figure 4:
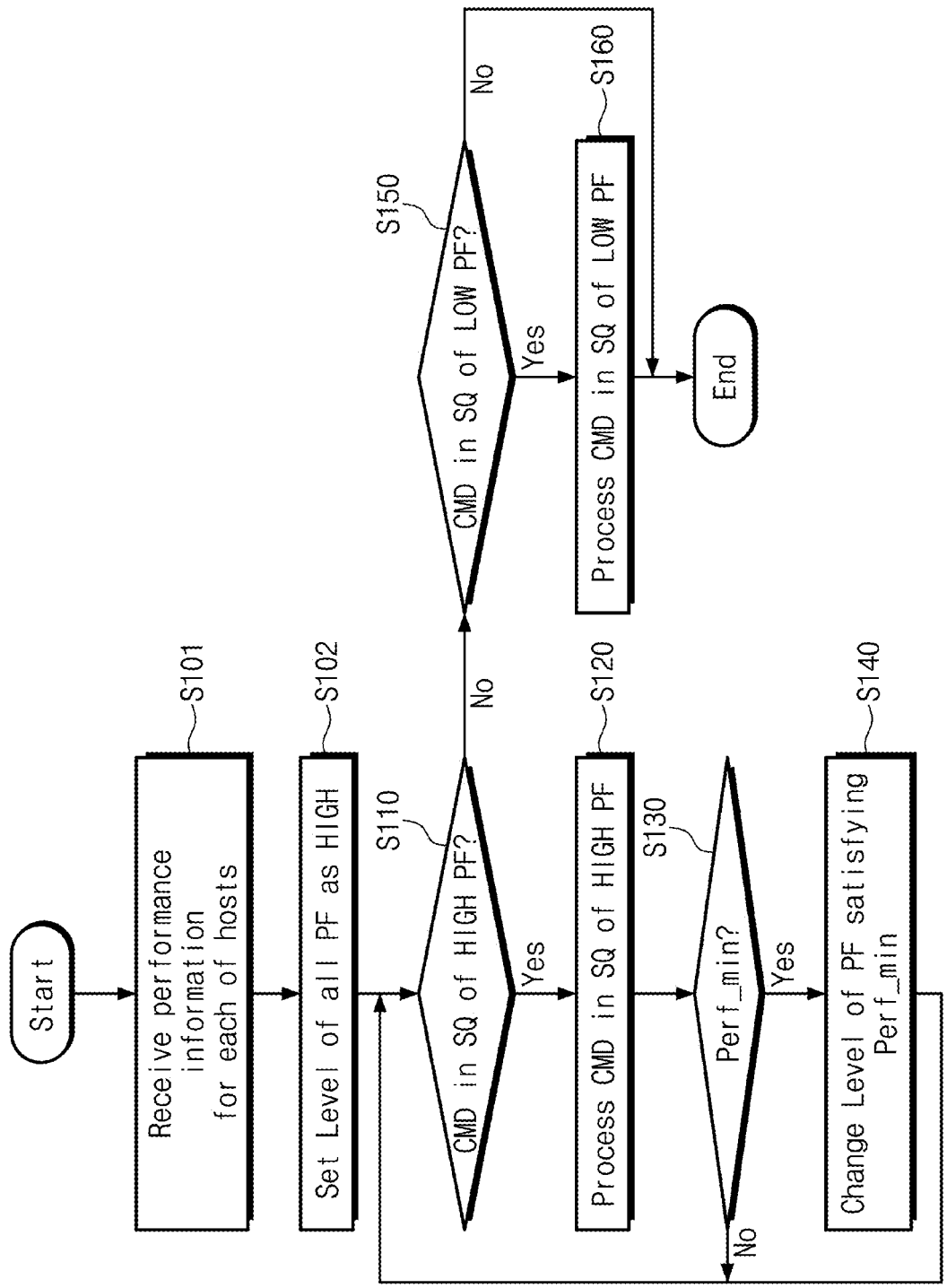
FIG. 4 is a flowchart illustrating an operation of a storage device of FIG. 1.

FIG. 4 is a flowchart illustrating an operation of a storage device of FIG. 1. Below, for convenience of description, a description will be given as one host manages one submission queue. For example, it is assumed that the first physical function PF1 corresponds to the first host 11 and the first host 11 manages a first submission queue SQ1. In some example embodiments, the first physical function PF1 may be configured to process a first command CMD1 from the first submission queue SQ1. However, the inventive concepts are not limited thereto. For example, one host may further manage a plurality of submission queues or any other command queues, and one physical function PF may be configured to process commands respectively associated with the plurality of submission queues.

Below, for convenience of description, the expression "the submission queue of the physical function" is used. The submission queue of the physical function may mean a submission queue that is managed by a host corresponding to the physical function.

Below, for convenience of description, it is assumed that the storage device 100 communicates with the first to third hosts 11 to 13 and the first to third hosts 11 to 13 correspond to the first to third physical functions PF1 to PF3, respectively. The first to third physical functions PF1 to PF3 are described with reference to FIGS. 3A to 3C, and thus, a detailed description thereof will not be repeated here. The above description is given only to describe some example embodiments of the inventive concepts easily, and the inventive concepts are not limited thereto.

Referring to FIGS. 1, 2, 3A, and 4, in operation S101, the storage device 100 may receive performance information from the first to third hosts 11 to 13, respectively. Performance information received from a given host may be understood to be performance information associated with the given host and may indicate, for example a minimum performance of the given host, a maximum performance of the given host, or the like. For example, each of the first to third hosts 11 to 13 may be a computing node, a processor, or an application (or a process), which is driven independently. In some example embodiments, each of the first to third hosts 11 to 13 may require a performance of a given level (e.g., maximum performance, minimum performance, etc.) depending on a scheme to drive or an application to be driven. The performance information received from a given host may indicate the given level of required performance for the given host. The storage device 100 may receive the performance information that the first to third hosts 11 to 13 respectively provide in response to the performance requirements for the first to third hosts 11 to 13.

In some example embodiments, the performance information may include information about (e.g., information indicating) a minimum performance and a maximum performance of each of the first to third hosts 11 to 13. The minimum performance may indicate a minimum performance that each of the first to third hosts 11 to 13 requires, and the maximum performance may indicate a maximum performance that each of the first to third hosts 11 to 13 requires or a maximum performance requiring limitation. The storage device 100 according to some example embodiments of the inventive concepts may provide each of the first to third hosts 11 to 13 with a performance that is the minimum performance or higher and is the maximum performance or lower (e.g., may enable a given host to operate at a performance that is between, e.g., inclusively between, the minimum performance and the maximum performance indicated by the performance information received from the respective host). The storage device 100 enabling a host to operate at a performance may be referred to as "servicing" a performance to the host.

In some example embodiments, the performance information of each of the first to third hosts 11 to 13 may be received in the process of initializing the storage device 100 or communicating with the storage device 100 for the first time.

In operation S102, the storage device 100 may set respective levels (e.g., performance levels) of all the physical functions PF to a high level HIGH, which may be referred to as a "first level". For example, the performance manager 111 (in particular, the performance level manager 111b) included in the storage controller 110 of the storage device 100 may set levels of the first to third physical functions PF1 to PF3 respectively corresponding to the first to third hosts 11 to 13 to "HIGH".

In operation S110, the storage device 100 may determine whether a command CMD is present in a submission queue of a physical function PF having the high level HIGH (e.g., a first physical function PF1, where a first host device 11 corresponds to the first physical function).

When the command CMD is present in the submission queue of the physical function PF having the high level HIGH, in operation S120, the storage device 100 may process the command CMD present in the submission queue of the physical function PF having the high level HIGH. For example, in the case where the first physical function PF1 of the first to third physical functions PF1 to PF3 has the high level HIGH and a first command CMD1 is present in the first submission queue SQ1 of the first physical function PF1 (e.g., at least one command from the first host device 11 corresponding to the first physical function PF1), the storage device 100 may process the first command CMD1 through the first physical function PF1. In detail, the storage controller 110 may fetch the first command CMD1 from the first submission queue SQ1 and may perform an operation corresponding to the first command CMD1 thus fetched with respect to the nonvolatile memory device 120, thereby servicing a performance to the first host 11. In some example embodiments, in the case where at least two physical functions of the first to third physical functions PF1 to PF3 have the high level "HIGH" and commands are present in submission queues associated with the at least two physical functions, the storage device 100 may process the commands sequentially or non-sequentially in compliance with an internal policy. In some example embodiments, the internal policy may be determined based on the performance information of each of the first to third hosts 11 to 13.

In operation S130, the storage device 100 may determine whether there is a physical function in which a minimum performance Perf_min is satisfied (e.g., the serviced performance at least meets the minimum performance Perf_min). For example, as described above, the performance information may include information about the minimum performance that each of the first to third hosts 11 to 13 requires. In some example embodiments, performance information received from each given host may including information indicating a minimum performance and/or maximum performance that the given host requires. In an example, performance information received from the first host 11 may include information indicating a minimum performance and/or a maximum performance that the first host requires 11. The performance manager 111 (in particular, the performance monitor 111c) included in the storage controller 110 of the storage device 100 may monitor a performance of each of the first to third hosts 11 to 13 (or the first to third physical functions PF1 to PF3) periodically or randomly. In some example embodiments, the performance of each of the first to third hosts 11 to 13 (or the first to third physical functions PF1 to PF3) may be determined based on the number of commands or a size of inputs/outputs processed per unit time with regard to the first to third hosts 11 to 13 (or the first to third physical functions PF1 to PF3). Accordingly, as described herein, a "performance" of a given host device and/or a performance "serviced" to the given host device may refer to a number (e.g., quantity) of commands processed per unit time and/or a size of inputs/outputs processed per unit time with regard to the given host based on processing one or more commands from the given host device through the corresponding physical function PF. Accordingly, the minimum performance of a host may be a particular threshold value of number (e.g., quantity) of commands processed per unit time and/or a size of inputs/outputs processed per unit time with regard to the given host, and the maximum performance of a host may be a separate threshold value of number (e.g., quantity) of commands processed per unit time and/or a size of inputs/outputs processed per unit time with regard to the given host.

The minimum performance of at least one host of the first to third hosts 11 to 13 may be satisfied (e.g., at least met) through operation S120. Restated, the "performance" serviced to the host (e.g., size of inputs/outputs processed per unit time with regard to the given host) may at least meet a minimum performance of the host. In some example embodiments, in operation S130, the storage device 100 may change a level of a physical function corresponding to a host, of which the minimum performance is satisfied. For example, the performance manager 111 (in particular, the performance level manager 111b) included in the storage controller 110 of the storage device 100 may change a level of a physical function corresponding to a host, of which the minimum performance is satisfied, to a low level LOW, which may be referred to as a "second level". As an example, after processing at least one command CMD from the first host device 11 through the first physical function PF1 at S110-S120, the performance level of the first physical function PF1 may be changed at S130-S140 to a second (e.g., lower) level based on performance information associated with the first host device 11 and a performance serviced to the first host device 11 based on processing the at least one command CMD1 from at least the first host device 11 through at least the first physical function PF1. The performance level of the first physical function PF1 may be changed to the second level based on a determination that the performance serviced to the first host 11 through the first physical function PF (e.g., at S110-S120) at least meets the minimum performance of the first host 11 as indicated in the performance information associated with the first host device 11.

In some example embodiments, changing the performance level of a physical function (e.g., first physical function PF1) may include monitoring the performance serviced to the corresponding host (e.g., first host 11) through the physical function (e.g., PF1), for example at S120, and comparing the monitored performance and the minimum performance of the corresponding host at S130, and responsively changing the performance level of the physical function (e.g., PF1) from HIGH (e.g., first level) to LOW (e.g., second level) in response to a determination, based on the comparing, that the monitored performance serviced to the corresponding host device at least meets (e.g., satisfies the minimum performance of the corresponding host device.

After operation S140, the storage device 100 may perform operation S110. In some example embodiments, when a host, of which the minimum performance is satisfied, does not exist, the storage device 100 may not perform operation S140 or may proceed to operation S110.

When a determination result of operation S110 indicates that a command is absent from the submission queue of the physical function having the high level HIGH (e.g., a second physical function PF2) (or a physical function having the high level HIGH does not exist), in operation S150, the storage device 100 may determine whether a command is present in a submission queue of a physical function having the low level LOW (e.g., a subsequent first command CMD1 is present in a submission queue of the first host device 11 corresponding to the first physical function PF1 after the performance level of the first physical function PF1 is changed at S130-S140). When a command is absent in the submission queue of the physical function having the low level LOW, the storage device 100 may not perform a separate operation.

When a command is present in the submission queue of the physical function PF having the low level LOW (e.g., the first physical function PF1 after the performance level of the first physical function PF1 is changed at S130-S140), in operation S160, the storage device 100 may process the command CMD present in the submission queue of the physical function having the low level LOW. Operation S160 is similar to operation S120 except that levels of physical functions are different, and thus, additional description will be omitted to avoid redundancy.

Accordingly, in some example embodiments, a second command (e.g., CMD2) from at least a second host device (e.g., host 12) of the plurality of host devices 11 to 1n through at least one second physical function (e.g., physical function PF2) of the plurality of physical functions that corresponds to the second host device (e.g., host 12) may be processed prior to processing a subsequent first command (e.g., CMD1) from the first host device 11 through the first physical function PF1, based on a performance level of the at least one second physical function (e.g., PF2) being a first level (e.g., HIGH) and the performance level of the first physical function PF1 being a second level (e.g., LOW).

As described above, the storage device 100 according to some example embodiments of the inventive concepts may schedule commands of a plurality of hosts based on a level of the physical function PF. In some example embodiments, the storage device 100 may change a level of the corresponding physical function depending on the minimum performance of each host is satisfied (e.g., at least met by the performance serviced to the respective host through a corresponding physical function). As such, because a command of a host, of which a minimum performance is not satisfied and thus the corresponding physical function PF (e.g., second physical function PF) has the high level HIGH, is preferentially processed in relation to commands of a host for which the corresponding physical function PF has the low level LOW (e.g., the first physical function PF1 for which the performance level is changed at S130-S140), it may be possible to prevent a specific host from occupying a physical resource of a storage device or to prevent an issue that minimum performance of another host is not secured. Accordingly, a storage device having an improved performance is provided.

Figure 5:
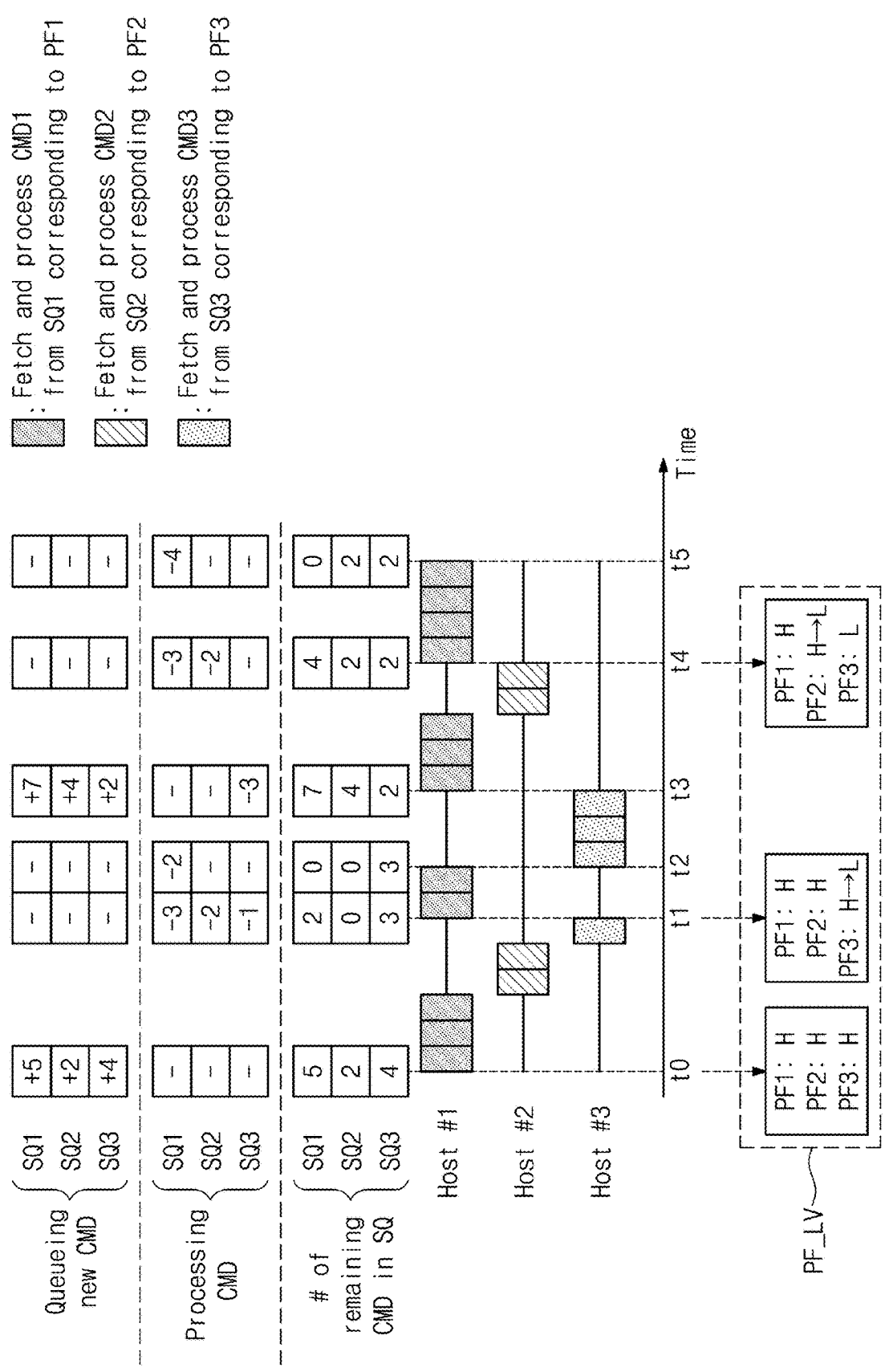
FIG. 5 is a diagram for describing an operation of a storage device according to a flowchart of FIG. 4.

FIG. 5 is a diagram for describing an operation of a storage device according to a flowchart of FIG. 4. For convenience of description, it is assumed that the first to third physical functions PF1 to PF3 respectively correspond to the first to third hosts 11 to 13 and the first to third physical functions PF1 to PF3 respectively process commands of the first to third submission queues SQ1 to SQ3 managed by the first to third hosts 11 to 13. Also, for convenience of description, it is assumed that the commands respectively included in the first to third submission queues SQ1 to SQ3 have the same I/O size. Numerical values illustrated in FIG. 5 are simple examples for describing some example embodiments of the inventive concepts easily, and the inventive concepts are not limited thereto.

Referring to FIGS. 1, 2, 3A, 4, and 5, at a 0-th time t0, the first host 11 may queue five first commands CMD1 in the first submission queue SQ1, may queue two second commands CMD2 in the second submission queue SQ2, and may queue four third commands CMD3 in the third submission queue SQ3. That is, at the 0-th time t0, the first submission queue SQ1 may include five first commands CMD1, the second submission queue SQ2 may include two second commands CMD2, and the third submission queue SQ3 may include four third commands CMD3.

At the 0-th time t0, the performance manager 111 (in particular, the performance level manager 111b) may set performance levels PF_LV of the first to third physical functions PF1 to PF3 respectively corresponding to the first to third hosts 11 to 13 to a high level "H".

During a period from t0 to t1, the storage device 100 may process the commands CMD1 to CMD3 included in the first to third submission queues SQ1 to SQ3. For example, as described with reference to FIG. 4, at the 0-th time t0, because the performance levels PF_LV of the first to third physical functions PF1 to PF3 are set to the high level "H" and the commands CMD1, CMD2, and CMD3 are included in the first to third submission queues SQ1 to SQ3 respectively corresponding to the first to third physical functions PF1 to PF3, the performance manager 111 (in particular, the command scheduler 111a) may perform scheduling such that the commands CMD1, CMD2, and CMD3 of the first to third submission queues SQ1 to SQ3 are processed.

In some example embodiments, the performance manager 111 (in particular, the command scheduler 111a) may schedule the commands CMD1, CMD2, and CMD3 of the first to third submission queues SQ1 to SQ3 based on performance information of the first to third hosts 11 to 13. For example, it is assumed that minimum performances of the first to third hosts 11 to 13 are 3 GB/s, 2 GB/s, and 1 GB/s, respectively. That is, a ratio of the minimum performances of the first to third hosts 11 to 13 may be 3:2:1. In some example embodiments, the performance manager 111 (in particular, the command scheduler 111a) may perform scheduling (also referred to herein as "command scheduling") on one or more commands from one or more hosts, such that the commands CMD1, CMD2, and CMD3 of the first to third submission queues SQ1 to SQ3 are processed at the ratio of 3:2:1 per unit time.

That is, during the period from t0 to t1, the storage device 100 may process three first commands CMD1 of the first submission queue SQ1, may process two second commands CMD2 of the second submission queue SQ2, and may process one third command CMD3 of the third submission queue SQ3. In some example embodiments, at a second time t2, the number of first commands CMD1 remaining in the first submission queue SQ1 may be "2", the number of second commands CMD2 remaining in the second submission queue SQ2 may be "0", and the number of third commands CMD3 remaining in the third submission queue SQ3 may be "3". However, the command scheduling method described above is an example, and the inventive concepts are not limited thereto.

The performances respectively serviced to the host devices based on performing the command scheduling may be monitored, and performance levels of one or more corresponding physical functions may be changed based on the monitoring. For example, at the first time t1, the minimum performance of the third host 13 may be satisfied. For example, the performance manager 111 (in particular, the performance monitor 111c) may monitor a performance serviced to each of the first to third hosts 11 to 13 in real time, periodically, or randomly. That the minimum performance of the third host 13 is satisfied may be determined based on a performance monitoring result at the first time t1.

In response to a determination that the minimum performance of the third host 13 is satisfied, the performance manager 111 (in particular, the performance level manager 111b) may change the performance level PF_LV of the third physical function PF3 corresponding to the third host 13 from the high level "H" to the low level "L".

Where a monitored performance of a host does not satisfy (e.g., at least meet) a corresponding minimum performance of the host as indicated by performance information, the performance level of the host may be maintained. For example, at time t1, the minimum performance of the first and second hosts 11 and 12 may not be satisfied, and thus the performance levels PV_LV of the first and second physical functions PF1 and PF2 corresponding to the first and second hosts 11 and 12 may be maintained at the high level "H".

At the first time t1, because two first commands CMD1 remain in the first submission queue SQ1 corresponding to the first physical function PF1, of which the performance level PF_LV is the high level "H" (e.g., based on the minimum performance of the first host 11 not being satisfied at t1), the storage device 100 may process two first commands CMD1 of the first submission queue SQ1 from the first time t1 to the second time t2. At the second time t2, the number of first commands CMD1 remaining in the first submission queue SQ1 may be "0", the number of second commands CMD2 remaining in the second submission queue SQ2 may be "0", and the number of third commands CMD3 remaining in the third submission queue SQ3 may be "3".

At the second time t2, because a command is absent from the first and second submission queues SQ1 and SQ2 corresponding to the first and second physical functions PF1 and PF2, of which the performance levels PF_LV are the high level "H", the performance manager 111 (in particular, the command scheduler 111a) may perform scheduling such that three third commands CMD3 of the third submission queue SQ3 are processed during a period from t2 to t3. At the third time t3, the first host 11 may queue seven first commands CMD1 in the first submission queue SQ1, the second host 12 may queue four second commands CMD2 in the second submission queue SQ2, and the third host 13 may queue two third commands CMD3 in the third submission queue SQ3. That is, at the third time t3, the number of first commands CMD1 remaining in the first submission queue SQ1 may be "7", the number of second commands CMD2 remaining in the second submission queue SQ2 may be "4", and the number of third commands CMD3 remaining in the third submission queue SQ3 may be "2".

At the third time t3, because the first and second commands CMD1 and CMD2 are present in the first and second submission queues SQ1 and SQ2 corresponding to the first and second physical functions PF1 and PF2, of which the performance levels PF_LV are the high level "H", the performance manager 111 (in particular, the command scheduler 111a) may perform scheduling such that the first and second commands CMD1 and CMD2 of the first and second submission queues SQ1 and SQ2 are first processed during a period from t3 to t4. For example, the storage device 100 may process three first commands CMD1 of the first submission queue SQ1 and may process two second commands CMD2 of the second submission queue SQ2. At the fourth time t4, the number of first commands CMD1 remaining in the first submission queue SQ1 may be "4", the number of second commands CMD2 remaining in the second submission queue SQ2 may be "2", and the number of third commands CMD3 remaining in the third submission queue SQ3 may be "2".

At the fourth time t4, that the minimum performance (i.e., a performance of 2 GB/s) for the second host 12 is satisfied may be determined based on a monitoring result of the performance manager 111 (in particular, the performance monitor 111c). In some example embodiments, the performance manager 111 (in particular, the performance level manager 111b) may change the performance level PF_LV of the second physical function PF2 corresponding to the second host 12, of which the minimum performance is satisfied, from the high level "H" to the low level "L". That is, at the fourth time t4, the performance level PF_LV of the first physical function PF1 may be the high level "H", the performance level PF_LV of the second physical function PF2 may be the low level "L", and the performance level PF_LV of the third physical function PF3 may be the low level "L".

In some example embodiments, because the first command CMD1 is present in the first submission queue SQ1 corresponding to the first physical function PF1, of which the performance level PF_LV is the high level "H", the performance manager 111 (in particular, the command scheduler 111a) may perform scheduling such that the first command CMD1 of the first submission queue SQ1 is first processed during a period from t4 to t5. In some example embodiments, at the fifth time t5, the number of first commands CMD1 remaining in the first submission queue SQ1 may be "0", the number of second commands CMD2 remaining in the second submission queue SQ2 may be "2", and the number of third commands CMD3 remaining in the third submission queue SQ3 may be "2".

In some example embodiments, at the fifth time t5, because the first command CMD1 is absent from the first submission queue SQ1 corresponding to the first physical function PF1, of which the performance level PF_LV is the high level "H", afterwards, there may be sequentially processed the second and third commands CMD2 and CMD3 of the second and third submission queues SQ2 and SQ3 corresponding to the second and third physical functions PF2 and PF3, of which the performance levels PF_LV are the low level "L".

That is, when a minimum performance of a specific host of a plurality of hosts is satisfied, the storage device 100 according to some example embodiments of the inventive concepts may decrease or change the performance level PF_LV of a physical function corresponding to the specific host. Afterwards, as commands corresponding to physical functions having a relatively high performance level PF_LV are preferentially processed, a minimum performance of each of the plurality of hosts may be secured.

Figure 6:
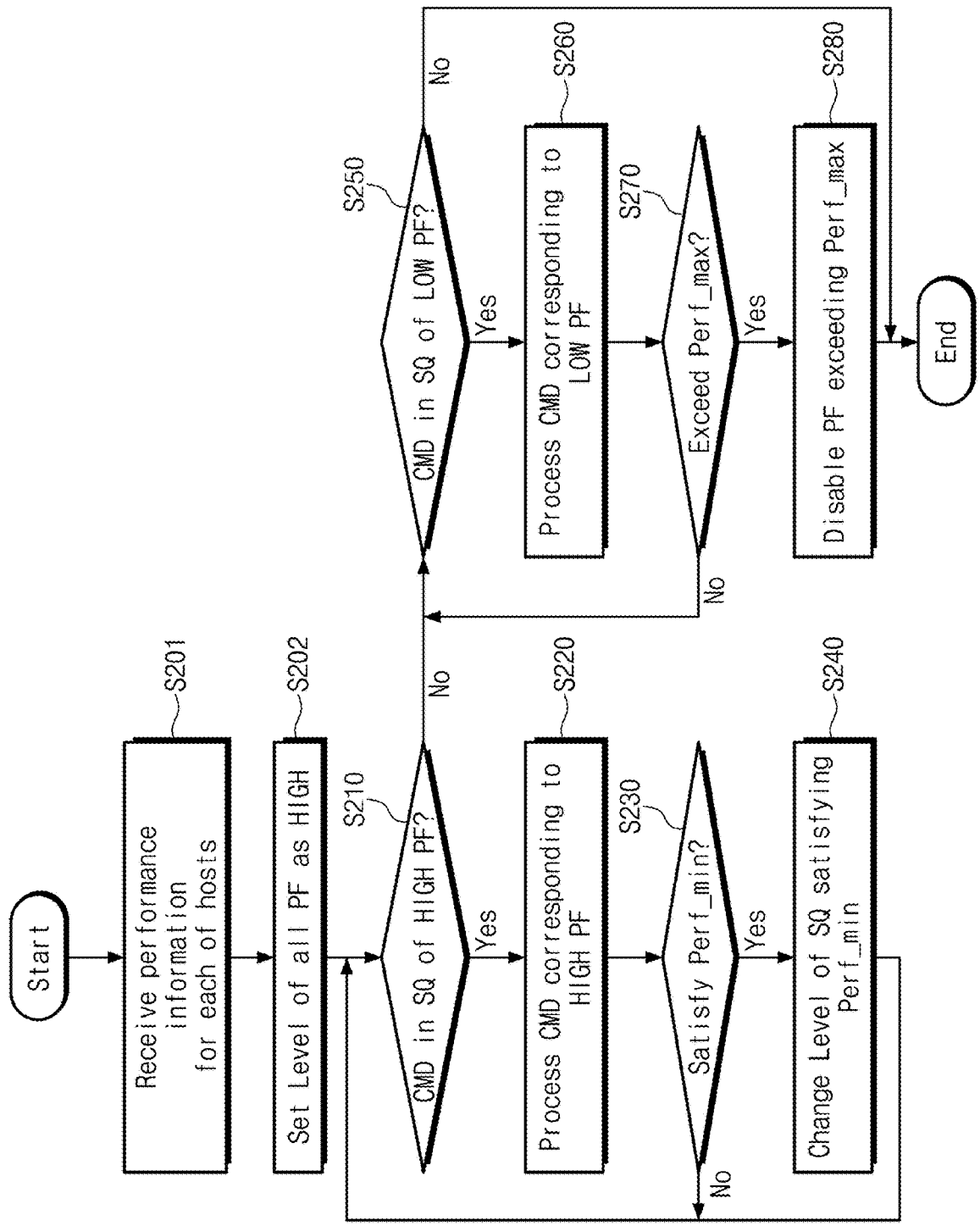
FIG. 6 is a flowchart illustrating an operation of a storage device of FIG. 1.

FIG. 6 is a flowchart illustrating an operation of a storage device of FIG. 1. For convenience of description, the detailed description of the same components is omitted. Referring to FIGS. 1, 2, 3A, and 4, the storage device 100 may perform operation S201, operation S202, operation S210, operation S220, operation S230, and operation S240. Operation S201, operation S202, operation S210, operation S220, operation S230, and operation S240 are similar to operation S101, operation S102, operation S110, operation S120, operation 130, and operation S140 of FIG. 4, and thus, additional description will be omitted to avoid redundancy.

When the determination result of operation S210 indicates that a command is absent from the submission queue of the physical function PF of the high level "HIGH", the storage device 100 may perform operation S250 and operation S260. Operation S250 and operation S260 are similar to operation S150 and operation S160 of FIG. 4, and thus, additional description will be omitted to avoid redundancy.

In operation S270, the storage device 100 may determine whether there is a physical function exceeding the maximum performance Perf_max (e.g., the serviced performance through the physical function exceeding the maximum performance Perf_max). For example, as described above, the performance manager 111 (in particular, the performance monitor 111c) of the storage controller 110 may monitor a performance of each of the first to third hosts 11 to 13. In some example embodiments, a performance of at least one of the first to third hosts 11 to 13 may exceed a maximum performance included in performance information. For example, it is assumed that maximum performances of the first to third hosts 11 to 13 are 3.2 GB/s, 2.2 GB/s, and 1.2 GB/s, respectively. During an operation of the storage device 100, a performance serviced to the third host 13 may exceed 1.2 GB/s. In some example embodiments, it may be determined that the third physical function PF3 corresponding to the third host 13 exceeds the maximum performance Perf_max.

When a physical function exceeding a maximum performance exists, in operation S280, the storage device 100 may disable the physical function exceeding the maximum performance Perf_max. In some example embodiments, the storage device 100 may set a performance level of the physical function exceeding the maximum performance Perf_max to a disable level DS. In some example embodiments, in the case where a specific physical function PF is disabled or the performance level PF_LV of the specific physical function PF is set to the disable level DS, a command corresponding to the specific physical function PF may not be processed. That is, a service of the specific physical function PF may not be provided. In some example embodiments, a command from a specific host may not be processed.

For example, referring back to FIGS. 4-5, when the performance information received at S201 includes information indicating a maximum performance of the first host device 11, the first physical function PF1 corresponding to the first host device 11 may be disabled at S280, in response to a determination at S270 that a performance serviced to the first host device 11 exceeds the maximum performance Perf_max of the first host device 11.

As described above, when a performance of a specific physical function exceeds a maximum performance, a storage device according to some example embodiments of the inventive concepts may disable the specific physical function. In some example embodiments, because the performance of the specific physical function is limited to the maximum performance or lower, issues occurring when the specific physical function occupies a physical resource of the storage device may be prevented.

Figure 7:
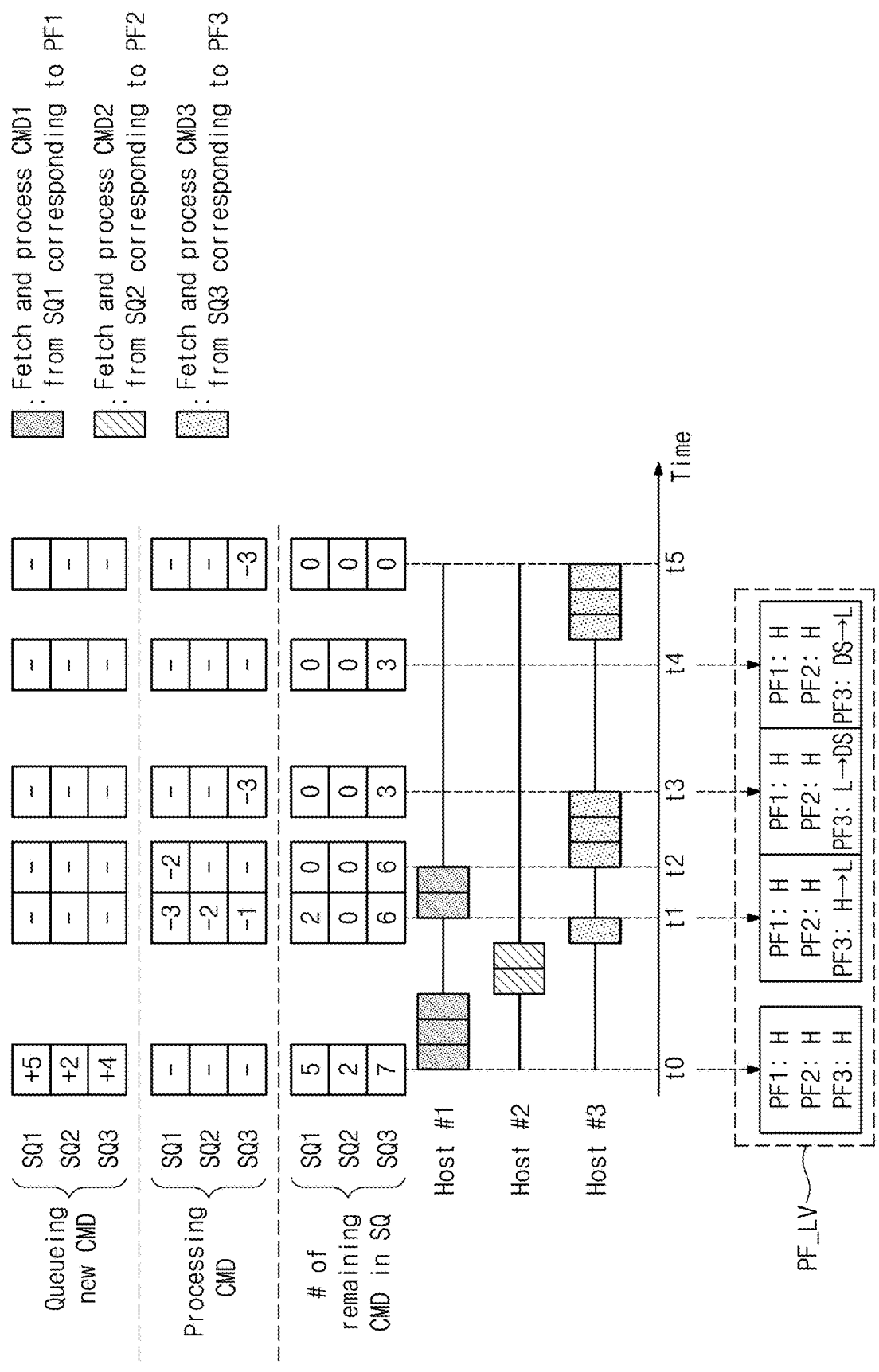
FIG. 7 is a diagram for describing an operation of a storage device according to the flowchart of FIG. 6.

FIG. 7 is a diagram for describing an operation of a storage device according to the flowchart of FIG. 6. For convenience of description, the detailed description of the same components is omitted. Referring to FIGS. 1, 2, 3A, 6, and 7, at a 0-th time t0, the first host 11 may queue five first commands CMD1 in the first submission queue SQ1, the second host 12 may queue two second commands CMD2 in the second submission queue SQ2, and the third host 13 may queue seven third commands CMD3 in the third submission queue SQ3. At the 0-th time t0, the number of first commands CMD1 remaining in the first submission queue SQ1 may be "5", the number of second commands CMD2 remaining in the second submission queue SQ2 may be "2", and the number of third commands CMD3 remaining in the third submission queue SQ3 may be "7". As in the above description given with reference to FIG. 5, at the 0-th time t0, the performance manager 111 may set the performance levels PF_LV of the first to third physical functions PF1 to PF3 to the high level "H".

Afterwards, during a period from t0 to t1, the performance manager 111 may schedule commands of the first to third submission queues SQ1 to SQ3. At the first time t1, the number of first commands CMD1 remaining in the first submission queue SQ1 may be "2", the number of second commands CMD2 remaining in the second submission queue SQ2 may be "0", and the number of third commands CMD3 remaining in the third submission queue SQ3 may be "6", and a minimum performance of the third physical function PF3 may be satisfied. As such, the performance manager 111 may change the performance level PF_LV of the third physical function PF3 from the high level "H" to the low level "L". Afterwards, the performance manager 111 may perform scheduling such that the first command CMD1 of the first submission queue SQ1 is processed during a period from t1 to t2 and the third command CMD3 of the third submission queue SQ3 is processed from the second time t2. At a third time t3, the number of first commands CMD1 remaining in the first submission queue SQ1 may be "0", the number of second commands CMD2 remaining in the second submission queue SQ2 may be "0", and the number of third commands CMD3 remaining in the third submission queue SQ3 may be "6"; at a fourth time t4, the number of first commands CMD1 remaining in the first submission queue SQ1 may be "0", the number of second commands CMD2 remaining in the second submission queue SQ2 may be "0", and the number of third commands CMD3 remaining in the third submission queue SQ3 may be "3". The command scheduling from the 0-th time t0 to the third time t3 is similar to that described with reference to FIG. 4 except that the numbers of commands are different, and thus, additional description will be omitted to avoid redundancy.

At the third time t3, the maximum performance Perf_max of the third host 13 may be exceeded. For example, during a period from t2 to t3, as the third commands CMD3 of the third submission queue SQ3 corresponding to the third host 13 are sequentially performed, a performance of the third host 13 may exceed the maximum performance Perf_max. As such, the performance manager 111 (in particular, the performance level manager 111b) may disable the third physical function PF3 corresponding to the third host 13 or may change the performance level PF_LV of the third physical function PF3 to the disable level DS.

In some example embodiments, as the third physical function PF3 is disabled, an operation of the third host 13 corresponding to the third physical function PF3 (i.e., an operation corresponding to the third command CMD3 included in the third submission queue SQ3) may not be performed. In other words, even though the third command CMD3 is present in the third submission queue SQ3, during a period from t3 to t4, the storage device 100 may not perform a separate operation.

At the fourth time t4, a performance of the third host 13 may be lower than a given level. In some example embodiments, the performance manager 111 may change the performance level PF_LV of the third physical function PF3 corresponding to the third host 13 from the disable level DS to the low level "L". Afterwards, during a period from t4 to t5, the performance manager 111 may perform scheduling such that the third command CMD3 of the third submission queue SQ3 corresponding to the third physical function PF3 is processed. In some example embodiments, the given level described above may be a value indicating a performance lower than a maximum performance of the third host 13.

In some example embodiments, during the period from t3 to t4, in the case where the first and second commands CMD1 and CMD2 are present in the first and second submission queues SQ1 and SQ2 corresponding to the first and second physical functions PF1 and PF2 other than the third physical function PF3 thus disabled, the first and second commands CMD1 and CMD2 may be scheduled depending on performance levels and minimum performances of the corresponding physical functions.

That is, as described above, when a performance of a specific host of a plurality of hosts exceeds a maximum performance, the storage device 100 according to some example embodiments of the inventive concepts may limit the performance of the specific host to the maximum performance by disabling a physical function corresponding to the specific host. As such, an issue that a physical resource of the storage device 100 is occupied by the specific host may be prevented.

Figure 8:
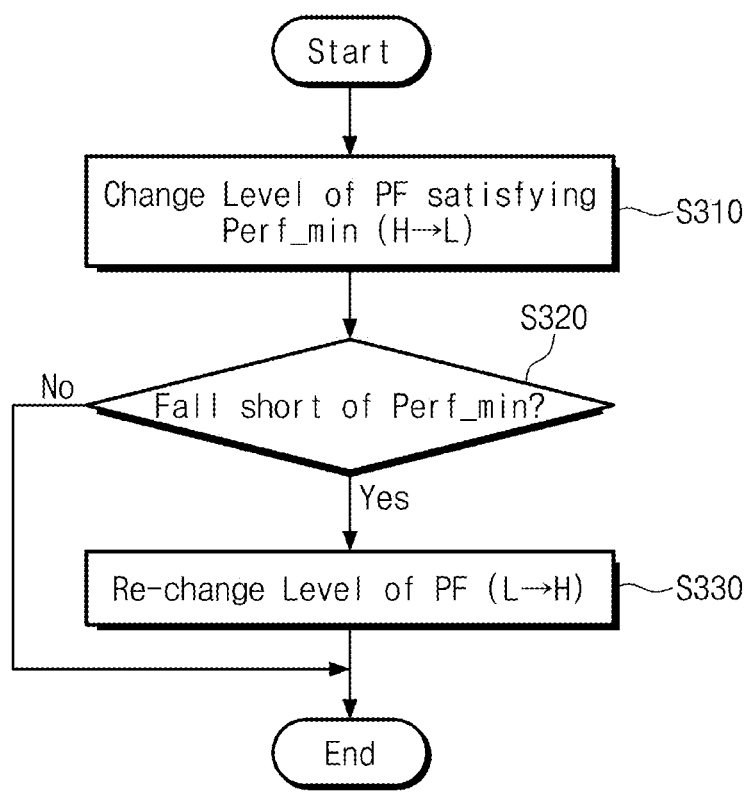
FIG. 8 is a flowchart illustrating an operation of a storage device of FIG. 1.

FIG. 8 is a flowchart illustrating an operation of a storage device of FIG. 1. For convenience of description, the detailed description of the same components is omitted. Referring to FIGS. 1, 2, 3A, and 8, in operation S310, the storage device 100 may change the performance level PF_LV of a physical function PF satisfying the minimum performance Perf_min from the high level "H" to the low level "L". For example, the storage device 100 may change a performance level of a physical function satisfying a minimum performance while operating based on the operation method described with reference to FIGS. 1 to 7.

In operation S320, the storage device 100 may determine whether there is a physical function failing to satisfy the corresponding minimum performance Perf_min from among physical functions, of which the performance levels PF_LV are the low level "L". For example, the physical functions, of which the performance levels PF_LV are the low level "L" may be physical functions satisfying the corresponding minimum performances. However, afterwards, due to an operation or command scheduling of the storage device 100, the corresponding minimum performance Perf_min of a specific physical function may not be satisfied. In some example embodiments, the storage device 100 may change the performance level PF_LV of the physical function failing to satisfy the corresponding minimum performance Perf_min (in other words, a physical function failing to satisfy the minimum performance Perf_min) from the low level "L" to the high level "H". As such, commands corresponding to the physical function failing to satisfy the corresponding minimum performance Perf_min may be processed prior to commands corresponding to any other physical function (e.g., a physical function satisfying the minimum performance Perf_min).

For example referring back to FIGS. 4-5, S330 may include changing the performance level of a first physical function PF1 from a second level (e.g., low level LOW) to a first level (e.g., high level HIGH) in response to a determination that a subsequent performance serviced to the first host device (e.g., 11), subsequently to changing the performance level of the first physical function PF1 from HIGH to LOW at S130-S140, fails to at least meet the minimum performance Perf_min.

The operation according to the flowchart of FIG. 8 is an example for describing a re-change of a performance level depending on whether a minimum performance of a physical function is satisfied, and the inventive concepts are not limited thereto. The storage device 100 according to the inventive concepts may additionally perform a performance level re-change operation according to the flowchart of FIG. 8 depending on whether to satisfy or fail to satisfy a minimum performance of a specific physical function, while performing the command scheduling operation described with reference to FIGS. 1 to 7.

Figure 9:
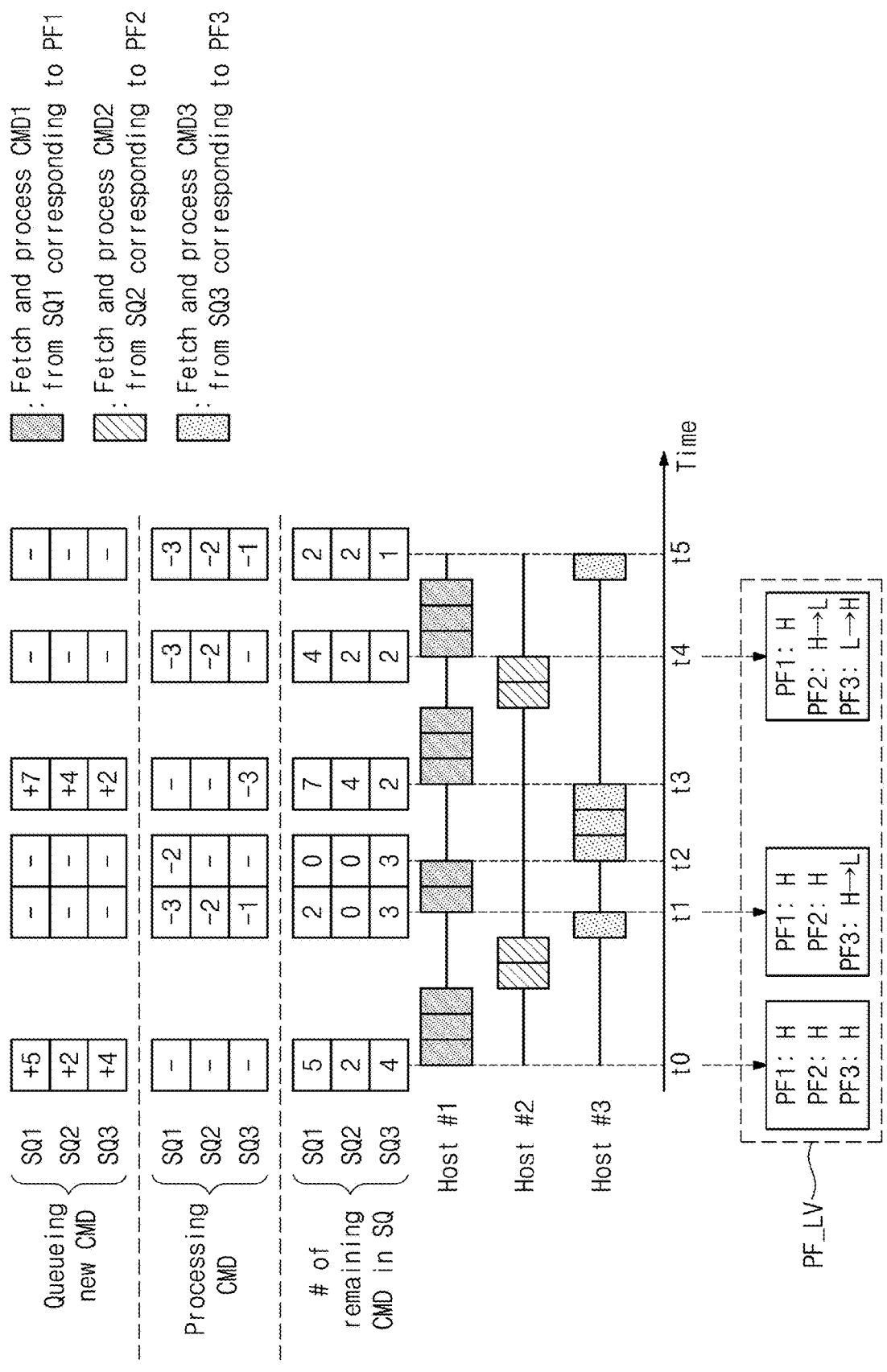
FIG. 9 is a diagram for describing an operation of a storage device according to a flowchart of FIG. 8.

FIG. 9 is a diagram for describing an operation of a storage device according to a flowchart of FIG. 8. For convenience of description, the detailed description of the same components is omitted. Referring to FIGS. 1, 2, 3A, 8, and 9, the storage device 100 may process the first to third commands CMD1 to CMD3 of the first to third submission queues SQ1 to SQ3 respectively corresponding to the first to third hosts 11 to 13 from a 0th time t0 to a fourth time t4 and may adjust physical levels of the first to third physical functions PF1 to PF3 respectively corresponding to the first to third hosts 11 to 13 based on performance information (i.e., minimum performances or maximum performances) of the first to third hosts 11 to 13. An operation of the storage device 100 during a period from t0 to t4 is similar to that described with reference to FIG. 5, and thus, additional description will be omitted to avoid redundancy.

At the fourth time t4 of FIG. 9, as a performance serviced by the second physical function PF2 satisfies the corresponding minimum performance (i.e., a minimum performance included in performance information of the second host 12), the performance manager 111 may change the performance level PF_LV of the second physical function PF2 from the high level "H" to the low level "L". A performance serviced by the third physical function PF3 may fail to satisfy the corresponding minimum performance (i.e., a minimum performance included in performance information of the third host 13). In some example embodiments, the performance manager 111 (in particular, the performance level manager 111b) may re-change the performance level PF_LV of the third physical function PF3 from the low level "L" to the high level "H".

That is, in the following operation, commands corresponding to the third physical function PF3 may be processed prior to commands corresponding to any other physical function (e.g., a physical function satisfying a minimum performance or a physical function, of which the performance level PF_LV is the low level "L", that is, the second physical function PF2). For example, as illustrated in FIG. 9, the performance manager 111 may perform a scheduling operation such that the first and third commands CMD1 and CMD3 of the first and third submission queues SQ1 and SQ3 corresponding to the first and third physical functions PF1 and PF3, of which the performance levels PF_LV are the high level "H" are first processed during a period from t4 to t5.

As described above, when a minimum performance of a specific physical function is satisfied, the storage device 100 according to some example embodiments of the inventive concepts may change a performance level of the specific physical function; afterwards, when the specific physical function again fails to satisfy the minimum performance, the storage device 100 may secure a minimum performance of each of a plurality of hosts by re-changing the performance level of the specific physical function.

Figure 10:
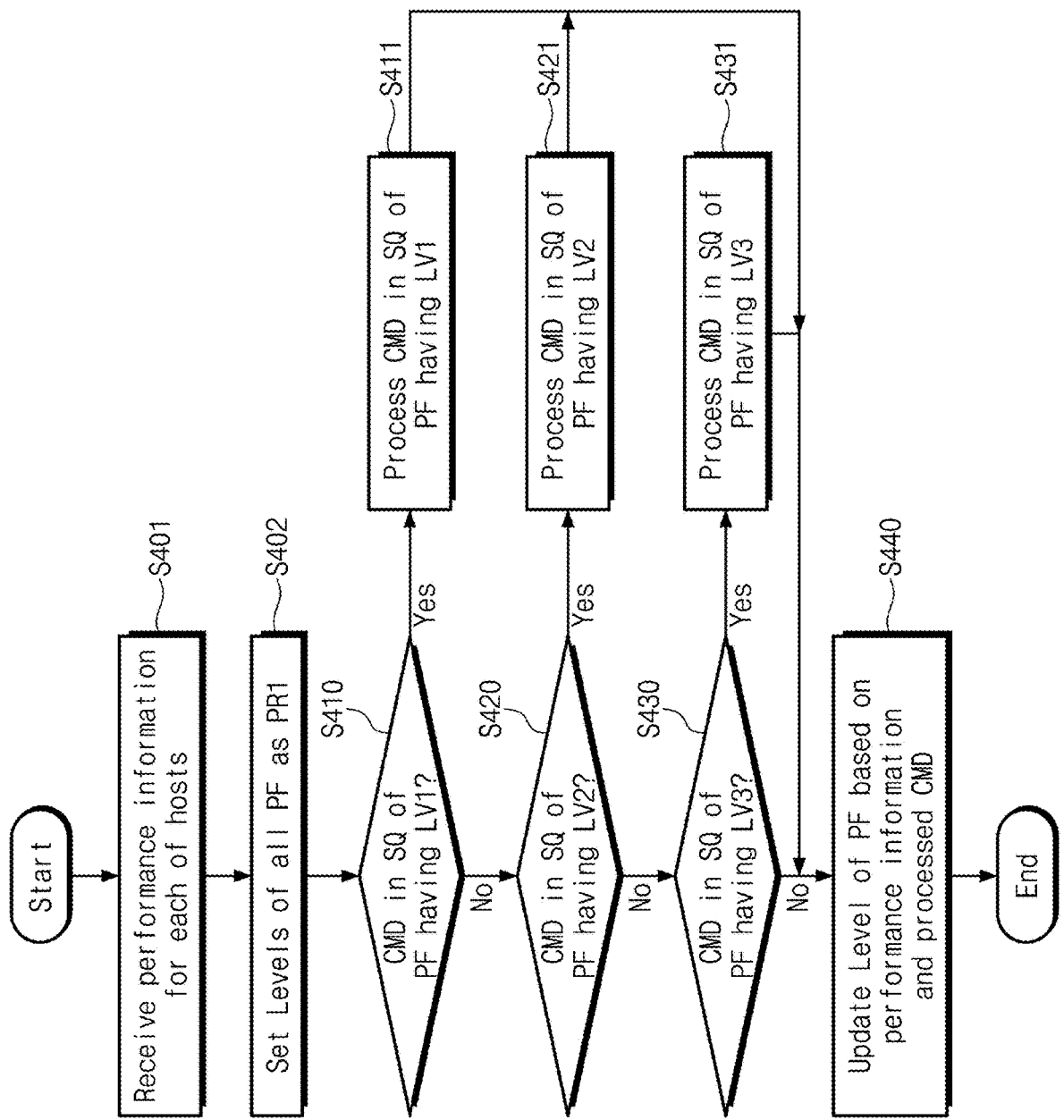
FIG. 10 is a flowchart illustrating an operation of a storage device of FIG. 1.

FIG. 10 is a flowchart illustrating an operation of a storage device of FIG. 1. For convenience of description, the detailed description of the same components is omitted. Referring to FIGS. 1, 2, 3A, and 10, the storage device 100 may perform operation S401. Operation S401 is similar to operation S101 of FIG. 4, and thus, additional description will be omitted to avoid redundancy.

In operation S402, the storage device 100 may set performance levels of all physical functions PF to a first level LV1. For example, in some example embodiments described above, a performance level is classified as the high level "H" or the low level "L" (or the disable level DS being further included). However, in some example embodiments, including the example embodiments shown in FIG. 10, the storage device 100 may classify the performance level PF_LV as one of a plurality of levels (e.g., LV1 to LV3).

For example, performance information may include a variety of performance information (e.g., minimum performance information, medium performance information, and maximum performance information) for each of a plurality of hosts. In the first operation, the performance levels PF_LV of all the physical functions PF may be set to the first level LV1. Afterwards, the performance level PF_LV of a physical function satisfying a minimum performance may be changed to the second level LV2. Afterwards, the performance level PF_LV of a physical function satisfying a medium performance may be changed to the third level LV3. In some example embodiments, a performance level of a physical function exceeding a maximum performance may be set to the disable level DS as described above.

In operation S410, the storage device 100 may determine whether a command is present in a submission queue of a physical function having the first level LV1. When a command is present in the submission queue of the physical function having the first level LV1, in operation S411, the storage device 100 may process commands present in a submission queue of the physical function having the first level LV1.

When a command is absent from the submission queue of the physical function having the first level LV1, in operation S420, the storage device 100 may determine whether a command is prevent in a submission queue of a physical function having the second level LV2. When a command is present in the submission queue of the physical function having the second level LV2, in operation S421, the storage device 100 may process commands present in a submission queue of the physical function having the second level LV2.

When a command is absent from the submission queue of the physical function having the second level LV2, in operation S430, the storage device 100 may determine whether a command is present in a submission queue of a physical function having the third level LV3. When a command is present in the submission queue of the physical function having the third level LV3, in operation S431, the storage device 100 may process commands present in a submission queue of the physical function having the third level LV3.

Operation S411, operation S421, and operation S431 are similar to those of the command processing method described above, and thus, additional description will be omitted to avoid redundancy.

Afterwards, in operation S440, the storage device 100 may update performance levels of physical functions based on performance information of each of a plurality of hosts and a processed command (or a performance serviced for each physical function). The way to set or update a performance level is described in operation S402, and thus, additional description will be omitted to avoid redundancy.

That is, as described above, the storage device 100 according to some example embodiments of the inventive concepts may manage a performance level by using a plurality of levels, based on a performance serviced by each of a plurality of physical functions and the corresponding performance information of each of the plurality of physical functions. That is, physical functions failing to satisfy a minimum performance (i.e., physical functions of the first level LV1) may be first serviced, physical functions failing to satisfy a medium performance (i.e., physical functions of the second level LV2) may be second serviced, and physical functions satisfying the medium performance and not exceeding a maximum performance (i.e., physical functions of the third level LV3) may be third serviced. Accordingly, the storage device 100 according to some example embodiments of the inventive concepts may satisfy a minimum performance, a medium performance, and a maximum performance that each of a plurality of hosts requires, and a physical resource of the storage device 100 may be prevented from being occupied by a specific host. In some example embodiments, a level of a physical function may be changed to various levels depending on provided performance information and a way to implement the storage device 100.

Figure 11:
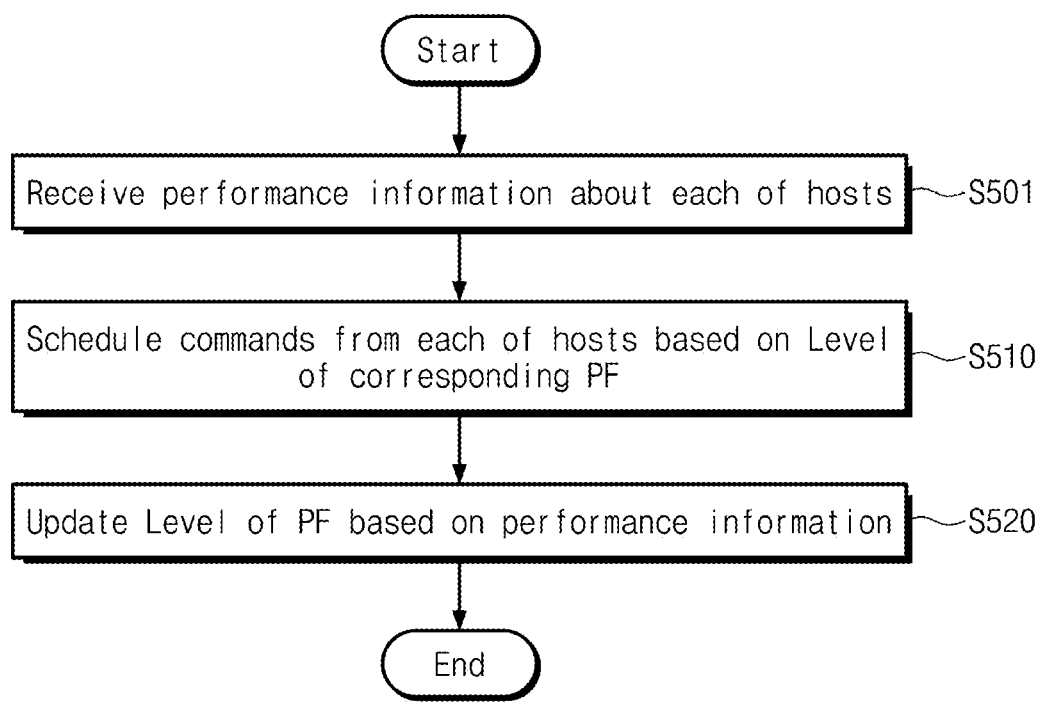
FIG. 11 is a flowchart illustrating an operation of a storage device of FIG. 1.

FIG. 11 is a flowchart illustrating an operation of a storage device of FIG. 1. For convenience of description, the detailed description of the same components is omitted. Referring to FIGS. 1 and 11, in operation S501, the storage device 100 may receive performance information from each of the plurality of hosts 11 to 1n. In some example embodiments, the performance information may include information about (e.g., information indicating) a minimum performance and/or a maximum performance of each of the plurality of hosts 11 to 1n. In some example embodiments, the performance information may be received from the plurality of hosts 11 to 1n in an initialization process of the storage device 100. In some example embodiments, the performance information may be received from the plurality of hosts 11 to 1n in an initial connection process of the storage device 100 with each of the plurality of hosts 11 to 1n.

In operation S510, the storage device 100 may schedule commands of each of the plurality of hosts 11 to 1n based on a performance level of the corresponding physical function. For example, the storage device 100 may schedule commands of each of the plurality of hosts 11 to 1n (or commands from the corresponding submission queue) based on the operation method described with reference to FIGS. 1 to 10.

In operation S520, the storage device 100 may update a performance level of a physical function based on the performance information. For example, the storage device 100 may update a performance level of a specific physical function depending on whether a minimum performance of the specific physical function is satisfied and whether a performance of the specific physical function exceeds the corresponding maximum performance, based on the operation method described with reference to FIGS. 1 to 10. In some example embodiments, the storage device 100 may perform the command scheduling operation described with reference to FIGS. 1 to 10, based on the updated performance level.

As described above, the storage device 100 according to some example embodiments of the inventive concepts may satisfy performance requirements of a plurality of hosts. Although not illustrated in drawings, the storage device 100 may perform a performance management operation (i.e., the operation described with reference to FIGS. 1 to 11) on a part of a plurality of hosts in response to a request of the part of the plurality of hosts or performance information thereof and may not perform the performance management operation on the remaining hosts.

FIG. 12 is a diagram for describing a configuration to receive performance information of FIG. 4. For brevity of illustration, indexes of a minimum performance and a maximum performance of each of the first to third physical functions PF1, PF2, and PF3 are illustrated in FIG. 12, but the inventive concepts are not limited thereto. For example, performance indexes of any other hosts or any other physical functions may be used.

Referring to FIGS. 1 and 12, the plurality of hosts 11 to 1n may provide the storage device 100 with the performance information or the performance indexes illustrated in FIG. 12. For example, the first host 11 may correspond to the first physical function PF1, and the first host 11 may provide the storage device 100 with information about the minimum performance and the maximum performance of the first physical function PF1. Likewise, the second and third hosts 12 and 13 may respectively correspond to the second and third physical functions PF2 and PF3, and each of the second and third hosts 12 and 13 may provide the storage device 100 with information about the minimum performance and the maximum performance of the second and third physical functions PF2 and PF3.

In some example embodiments, the minimum performance information may include information about sequential write minimum performances SW_min1 to SW_min3, sequential read minimum performances SR_min1 to SR_min3, random write minimum performances RW_min1 to RW_min3, and random read minimum performances RR_min1 to RR_min3 of the first to third physical functions PF1 to PF3. The maximum performance information may include information about sequential write maximum performances SW_max1 to SW_max3, sequential read maximum performance SR_max1 to SR_max3, random write maximum performances RW_max1 to RW_max3, and random read maximum performances RR_max1 to RR_max3 of the first to third physical functions PF1 to PF3.

In some example embodiments, the minimum performance information or the maximum performance information may be provided from each of the plurality of hosts 11 to 1n to the storage device 100 through a "set features" command or vendor commands.

In some example embodiments, the storage controller 110 or 210 according to some example embodiments of the inventive concepts may control a performance level, as described with reference to FIGS. 1 to 11, based on information about the minimum performance illustrated in FIG. 12. In some example embodiments, in some example embodiments, the storage controller 110 or 210 according to some example embodiments of the inventive concepts may disable a specific physical function, as described with reference to FIGS. 1 to 11, based on information about the maximum performance illustrated in FIG. 12. The configuration to change a performance level or disable a specific physical function is described above, and thus, additional description will be omitted to avoid redundancy.

Figure 13:
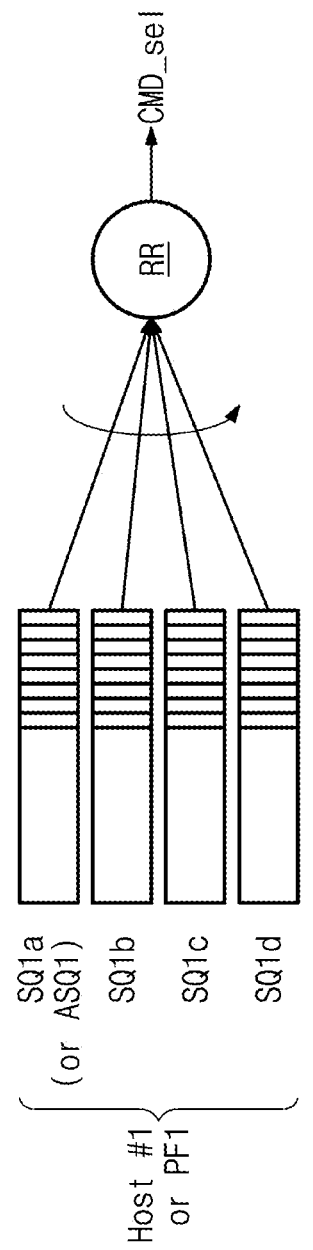
FIGS. 13 and 14 are diagrams for describing an order in which a storage device processes commands of a host of FIG. 1.
Figure 14:
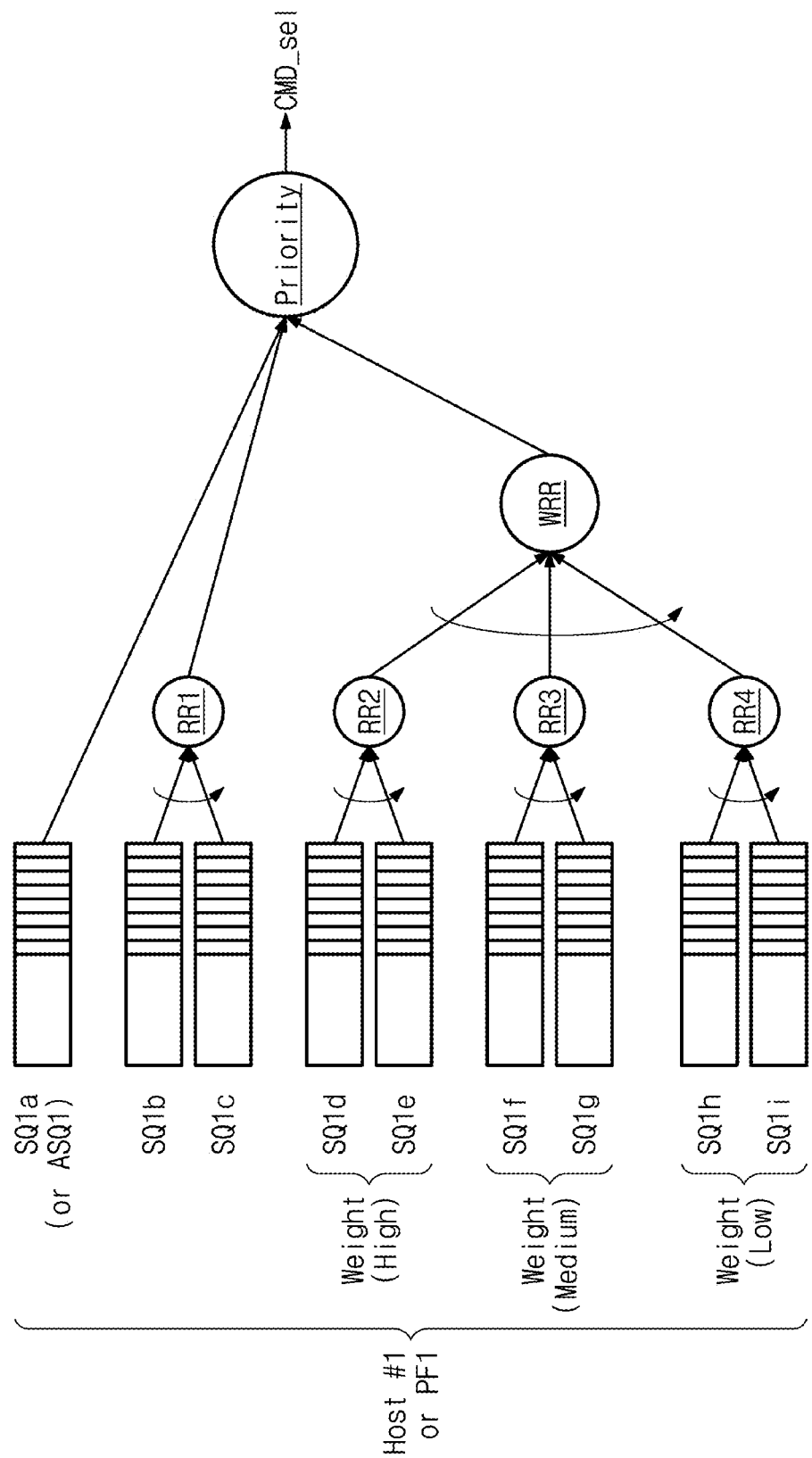

FIGS. 13 and 14 are diagrams for describing an order in which a storage device processes commands of a host of FIG. 1. An order in which the storage device 100 processes commands for one host (e.g., the first host 11) or a physical function (e.g., the first physical function PF1) corresponding to one host will be described with reference to FIGS. 13 and 14. That is, the command processing order to be described with reference to FIGS. 13 and 14 is associated with one host or one physical function. That is, the command processing order to be described with reference to FIGS. 13 and 14 shows a command processing order of submission queues corresponding to one of a plurality of hosts or a plurality of physical functions described with reference to FIGS. 1 to 11.

Referring to FIGS. 1 and 13, the first host 11 may manage a plurality of submission queues SQ1a to SQ1d. That is, the first host 11 may queue a first command in each of the plurality of submission queues SQ1a to SQ1d depending on a currently running process or a core processing a process. In some example embodiments, at least one submission queue (e.g., SQ1a) of the plurality of submission queues SQ1a to SQ1d may be an admin queue ASQ1.

The storage controller 110 (in detail, the first physical function PF1) of the storage device 100 may select one of commands included in the plurality of submission queues SQ1a to SQ1d based on a round robin (RR) scheme and may process the selected command CMD_sel.

Referring to FIGS. 1 and 14, the first host 11 may manage a plurality of submission queues SQ1a to SQ1i. That is, the first host 11 may queue a first command in each of the plurality of submission queues SQ1a to SQ1i depending on a currently running process or a core processing a process. In some example embodiments, at least one submission queue (e.g., SQ1a) of the plurality of submission queues SQ1a to SQ1i may be an admin queue ASQ1.

In some example embodiments, the first physical function PF1 corresponding to the first host 11 may select a command from the plurality of submission queues SQ1a to SQ1i based on a weighted round robin (WRR) scheme and may process the selected command CMD_sel. For example, in the plurality of submission queues SQ1a to SQ1i, the submission queues SQ1b and SQ1c may be set to "Urgent", the submission queues SQ1d and SQ1e may be set to have a high weight, the submission queues SQ1f and SQ1g may be set to have a medium weight, and the submission queues SQ1h and SQ1i may be set to have a low weight. In some example embodiments, attributes or priorities of submission queues may be determined or set by the process of creating a submission queue (e.g., creation I/O submission queue) or in the process of creating a completion queue corresponding to a submission queue (e.g., creation I/O completion queue). That is, attributes or priorities of submission queues may be determined or managed by the first host 11.

The first physical function PF1 corresponding to the first host 11 may first process commands of the submission queue SQ1a being the admin queue ASQ1. Afterwards, the first physical function PF1 may process commands of the submission queues SQ1b and SQ1c set to "Urgent" depending on a priority scheme Priority. A command to be processed from among the commands of the submission queues SQ1b and SQ1c may be selected by a first round robin RR1.

Afterwards, the first physical function PF1 may process commands of the submission queues SQ1d to SQ1i depending on the priority scheme Priority. According to the weighted round robin scheme WRR, commands of the submission queues SQ1d and SQ1e having a high weight from among commands of the submission queues SQ1d to SQ1i may be first selected, commands of the submission queues SQ1f and SQ1g having a medium weight from among commands of the submission queues SQ1d to SQ1i may be second selected, and commands of the submission queues SQ1h and SQ1i having a low weight from among commands of the submission queues SQ1d to SQ1i may be third selected. A command to be processed from among the commands of the submission queues SQ1d and SQ1e having the high weight may be selected by a second round robin scheme RR2, a command to be processed from among the commands of the submission queues SQ1f and SQ1g having the medium weight may be selected by a third round robin scheme RR3, and a command to be processed from among the commands of the submission queues SQ1h and SQ1i having the low weight may be selected by a fourth round robin scheme RR4.

As described above, each of a plurality of hosts may manage a plurality of submission queues and priorities or weights of the submission queues, and the plurality of submission queues corresponding to each of the plurality of hosts may be arbitrated depending on various schemes. In some example embodiments, the priorities or weights of the plurality of submission queues managed by each of the plurality of hosts may be determined in the process of creating the plurality of submission queues. That is, the priorities or weights of the plurality of submission queues may have fixed levels. In contrast, the performance level PF_LV of the physical function PF according to some example embodiments of the inventive concepts may be different in configuration from the priorities or weights of the plurality of submission queues described above and may have a characteristic variable depending on a performance level of each of the plurality of hosts is satisfied.

In some example embodiments, the storage device 100 according to some example embodiments of the inventive concepts may directly control a priority and a weight of each of submission queues depending on performance requirements of the plurality of hosts are satisfied, as described above. This is similar to configuration to control the performance level PF_LV of the physical function PF, and thus, additional description will be omitted to avoid redundancy. In some example embodiments, in the case where the storage device 100 directly controls priorities of submission queues, the storage device 100 may provide information about changed priorities of the submission queues to the plurality of hosts, and the plurality of hosts may queue commands based on the changed priorities.

Independently of the priorities or the weights of the submission queues managed by each of the plurality of hosts, the storage device 100 according to some example embodiments of the inventive concepts may manage performance levels of physical functions respectively corresponding to the plurality of hosts based on whether a minimum performance of each of the plurality of hosts is satisfied and whether a performance of each of the plurality of hosts exceeds a maximum performance and may schedule commands from the plurality of hosts based on the performance levels. Accordingly, the performance requirements of the plurality of hosts may be satisfied.

Figure 15:
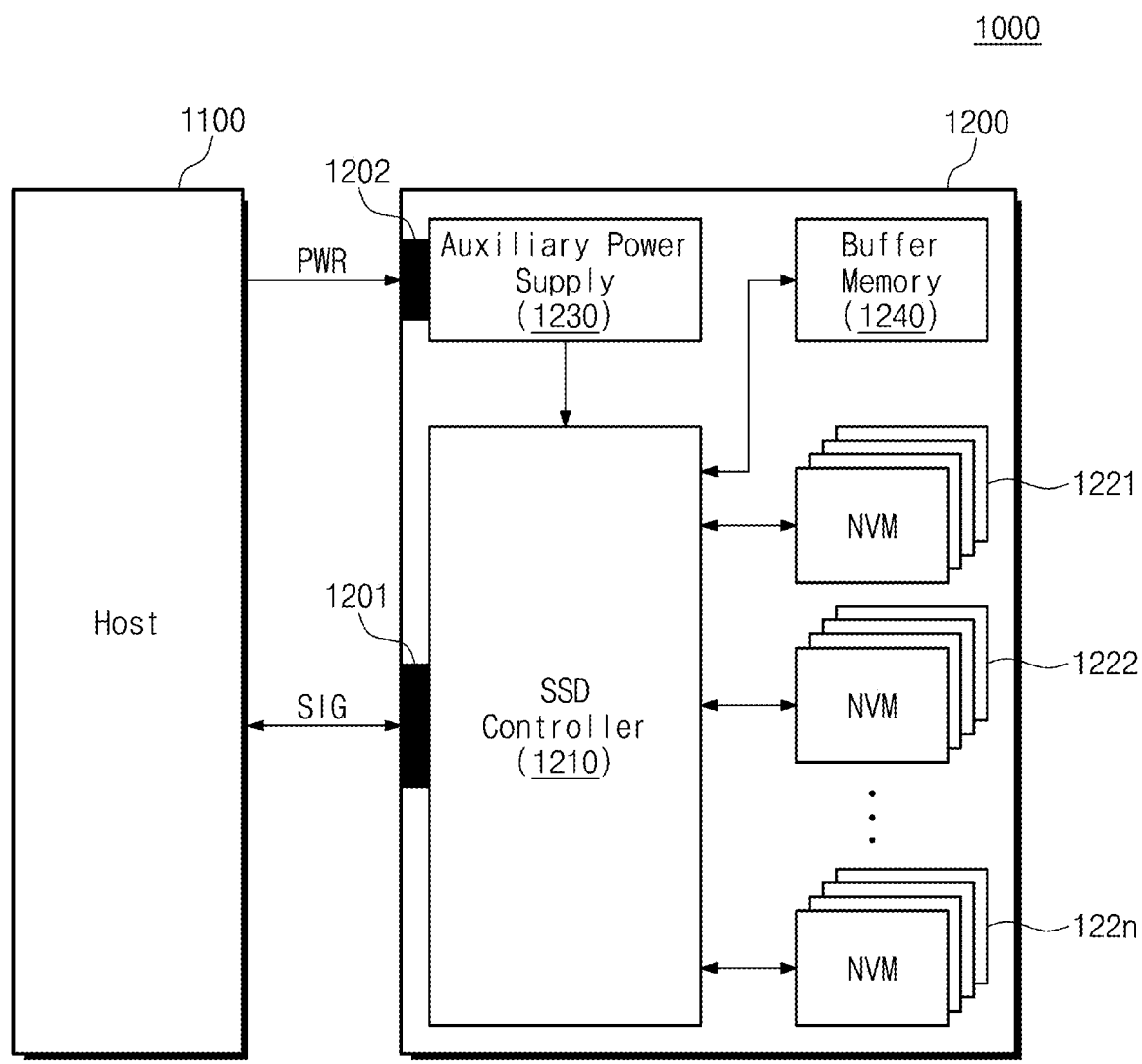
FIG. 15 is a block diagram illustrating an SSD system to which a storage system according to the inventive concepts are applied.

FIG. 15 is a block diagram illustrating an SSD system to which a storage system according to the inventive concepts are applied. Referring to FIG. 15, an SSD system 1000 may include a host 1100 and a storage device 1200. The storage device 1200 may exchange signals SIG with the host 1100 through a signal connector 1201 and may be supplied with a power PWR through a power connector 1202. The storage device 1200 includes a solid state drive controller 1210 (e.g., SSD controller), a plurality of nonvolatile memories 1221 to 122n, an auxiliary power supply 1230, and a buffer memory 1240.

The SSD controller 1210 may control the plurality of nonvolatile memories 1221 to 122n in response to the signals SIG received from the host 1100. The plurality of nonvolatile memories 1221 to 122n may operate under control of the SSD controller 1210. The auxiliary power supply 1230 is connected with the host 1100 through the power connector 1202. The auxiliary power supply 1230 may be charged by the power PWR supplied from the host 1100. When the power PWR is not smoothly supplied from the host 1100, the auxiliary power supply 1230 may power the storage device 1200.

The buffer memory 1240 may be used as a buffer memory of the storage device 1200. In some example embodiments, the buffer memory 1240 may be used as the controller memory buffer CMB of the storage device 100 described with reference to FIGS. 1 to 14.

In some example embodiments, the host 1100 may be a multi-host described with reference to FIGS. 1 to 14, and the nonvolatile memory device 120 (e.g., SSD) may be the storage device 100 described with reference to FIGS. 1 to 14 or may operate based on the operation method described with reference to FIGS. 1 to 14.

Figure 16:
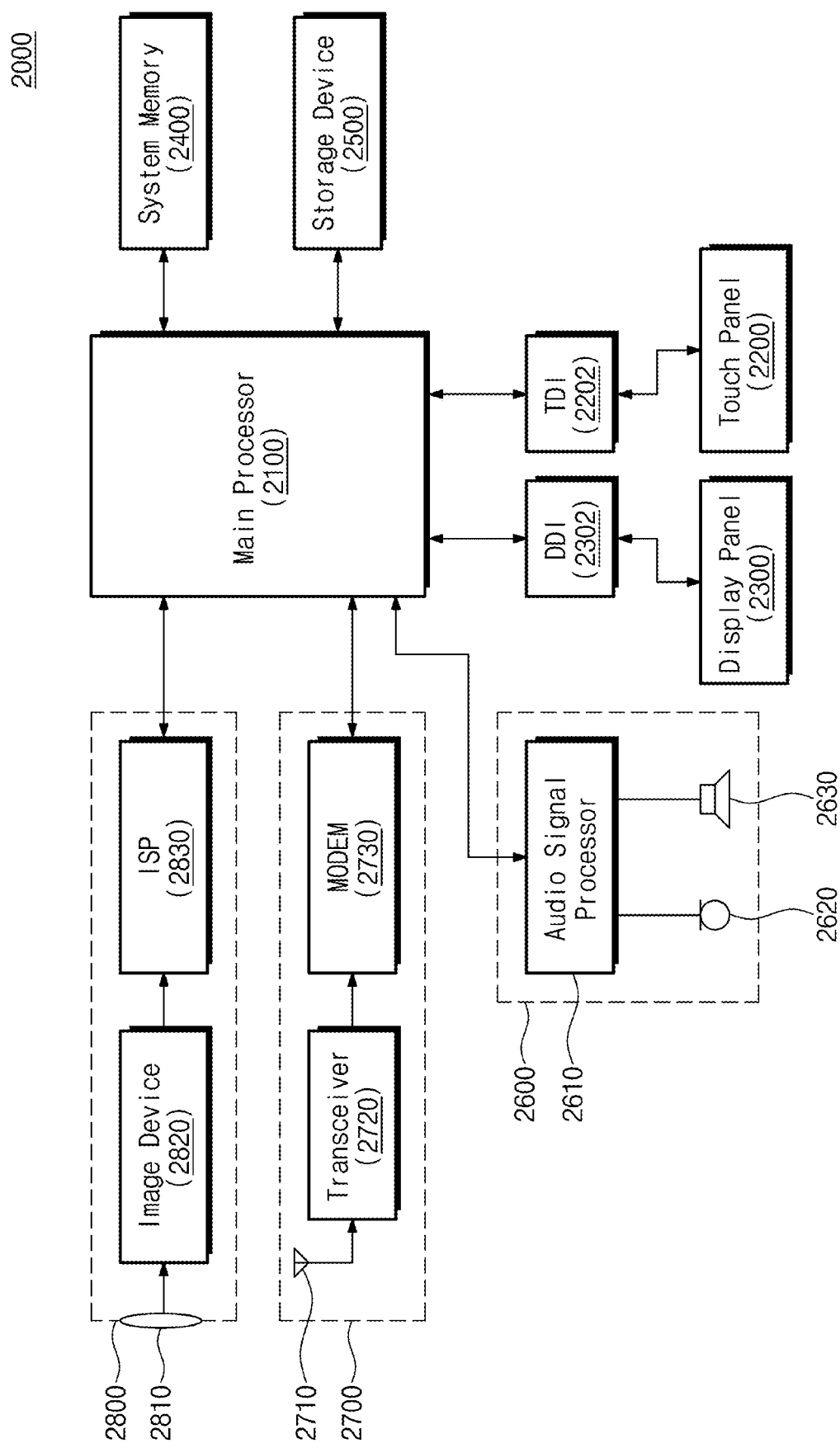
FIG. 16 is a block diagram illustrating an electronic device to which a storage system according to the inventive concepts are applied.

FIG. 16 is a block diagram illustrating an electronic device to which a storage system according to the inventive concepts are applied. Referring to FIG. 16, an electronic device 2000 may include a main processor 2100, a touch panel 2200, a touch driver integrated circuit 2202, a display panel 2300, a display driver integrated circuit 2302, a system memory 2400, a storage device 2500, an audio processor 2600, a communication block 2700, and an image processor 2800. In some example embodiments, the electronic device 2000 may be one of various electronic devices such as a personal computer, a laptop computer, a server, a workstation, a portable communication terminal, a personal digital assistant (PDA), a portable media player (PMP), a digital camera, a smartphone, a tablet computer, and a wearable device.

The main processor 2100 may control overall operations of the electronic device 2000. The main processor 2100 may control/manage operations of the components of the electronic device 2000. The main processor 2100 may process various operations for the purpose of operating the electronic device 2000.

The touch panel 2200 may be configured to sense a touch input from a user under control of the touch driver integrated circuit 2202. The display panel 2300 may be configured to display image information under control of the display driver integrated circuit 2302.

The system memory 2400 may store data that are used for an operation of the electronic device 2000. For example, the system memory 2400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 2500 may store data regardless of whether a power is supplied. For example, the storage device 2500 may include at least one of various nonvolatile memories such as a flash memory, a PRAM, an MRAM, a ReRAM, and a FRAM. For example, the storage device 2500 may include an embedded memory and/or a removable memory of the electronic device 2000.

The audio processor 2600 may process an audio signal by using an audio signal processor 2610. The audio processor 2600 may receive an audio input through a microphone 2620 or may provide an audio output through a speaker 2630.

The communication block 2700 may exchange signals with an external device/system through an antenna 2710. A transceiver 2720 and a modulator/demodulator (MODEM) 2730 of the communication block 2700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 2800 may receive a light through a lens 2810. An image device 2820 and an image signal processor 2830 included in the image processor 2800 may generate image information about an external object, based on a received light.

In some example embodiments, the storage device 2500 may be the storage device 100 described with reference to FIGS. 1 to 14 and may support a multi-host or a multi-tenant. For example, based on the operation method described with reference to FIGS. 1 to 14, the storage device 2500 may satisfy performance requirements on a plurality of cores included in the main processor 2100 or may satisfy performance requirements on a plurality of processes executable by the main processor 2100. In some example embodiments, the storage device 2500 may communicate with an external device or an external host through the communication block 2700 and may satisfy performance requirements on the main processor 2100, the external device, or the external host based on the method described with reference to FIGS. 1 to 14.

Figure 17:
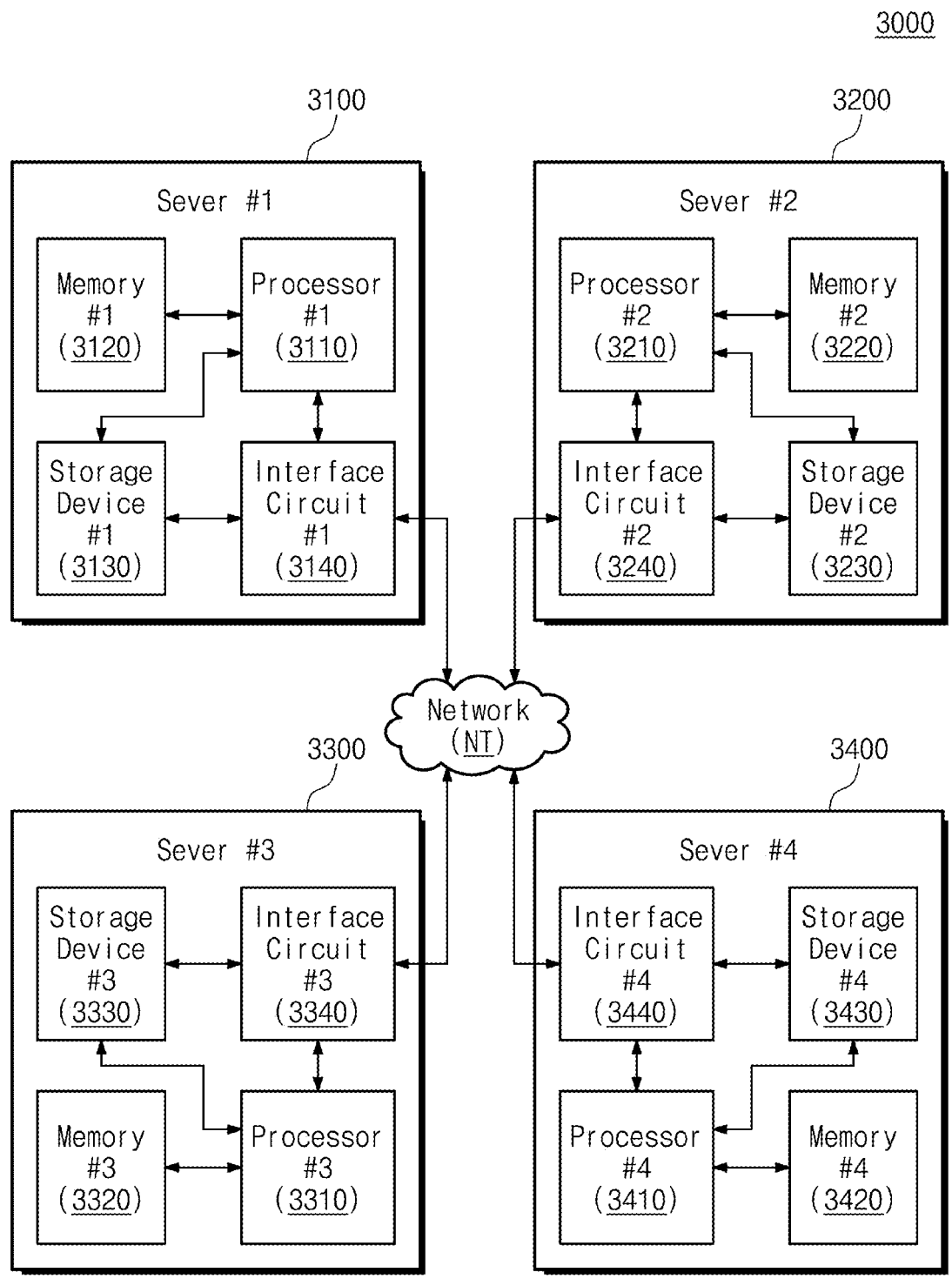
FIG. 17 is a block diagram illustrating a data center to which a storage system according to some example embodiments of the inventive concepts are applied.

FIG. 17 is a block diagram illustrating a data center to which a storage system according to some example embodiments of the inventive concepts are applied. Referring to FIG. 17, a data center 3000 may include a plurality of computing nodes 3100 to 3400 (which may be servers). The plurality of computing nodes 3100 to 3400 may communicate with each other over a network NT. In some example embodiments, the network NT may be a storage dedicated network such as a storage area network (SAN) or may be an Internet network such as TCP/IP. In some example embodiments, the network NT may include at least one of various communication protocols such as Fibre channel, iSCSI protocol, FCoE, NAS, and NVMe-oF.

The plurality of computing nodes 3100 to 3400 may include processors 3110, 3210, 3310, and 3410, memories 3120, 3220, 3320, and 3420, storage devices 3130, 3230, 3330, and 3430, and interface circuits 3140, 3240, 3340, and 3440.

For example, the first computing node 3100 may include the first processor 3110, the first memory 3120, the first storage device 3130, and the first interface circuit 3140. In some example embodiments, the first processor 3110 may be implemented with a single core or a multi-core. The first memory 3120 may include a memory such as a DRAM, an SDRAM, an SRAM, a 3D XPoint memory, an MRAM, a PRAM, an FeRAM, or an ReRAM. The first memory 3120 may be used as a system memory, a working memory, or a buffer memory of the first computing node 3100. The first storage device 3130 may be a high-capacity storage medium such as a hard disk drive (HDD) or a solid state drive (SSD). The first interface circuit 3140 may be a network interface controller (NIC) configured to support communication over the network NT.

In some example embodiments, the first processor 3110 of the first computing node 3100 may be configured to access the first memory 3120 based on a given memory interface. In some example embodiments, in some example embodiments of a shared memory architecture, the first processor 3110 of the first computing node 3100 may be configured to access the memories 3220, 3320, and 3420 of the remaining computing nodes 3200, 3300, and 3400 over the network NT. The interface circuit 3140 may include a network switch (not illustrated) configured to control or support an access to a shared memory (i.e., memories of any other computing nodes).

In some example embodiments, the first processor 3110 of the first computing node 3100 may be configured to access the first storage device 3130 based on a given storage interface. In some example embodiments, the first processor 3110 of the first computing node 3100 may be configured to access the storage devices 3230, 3330, and 3430 of the remaining computing nodes 3200, 3300, and 3400 over the network NT. The interface circuit 3140 may include a network switch (not illustrated) configured to control or support an access to storage devices of any other computing nodes. In some example embodiments, the storage devices 3130 to 3430 respectively included in the plurality of computing nodes 3100 to 3140 may constitute one RAID volume.

Operations of the second to fourth computing nodes 3200 to 3400 may be similar to the operation of the first computing node 3100 described above, and thus, additional description will be omitted to avoid redundancy.

In some example embodiments, various applications may be executed at the data center 3000. The applications may be configured to execute an instruction for data movement or copy between the computing nodes 3100 to 3400 or may be configured to execute instructions for combining, processing, or reproducing a variety of information present on the computing nodes 3100 to 3400. In some example embodiments, the applications may be executed by one of the plurality of computing nodes 3100 to 3400 included in the data center 3000, or the applications may be distributed and executed between the plurality of computing nodes 3100 to 3400.

In some example embodiments, the data center 3000 may be used for high-performance computing (HPC) (e.g., finance, petroleum, materials science, meteorological prediction), an enterprise application (e.g., scale out database), a big data application (e.g., NoSQL database or in-memory replication).

In some example embodiments, at least one of the plurality of computing nodes 3100 to 3400 may be an application server. The application server may be configured to execute an application configured to perform various operations at the data center 3000. At least one of the plurality of computing nodes 3100 to 3400 may be a storage server. The storage server may be configured to store data that are generated or managed at the data center 3000.

In some example embodiments, the plurality of computing nodes 3100 to 3400 included in the data center 3000 or portions thereof may be present at the same site or at sites physically separated from each other and may communicate with each other over a network NT based on the wireless communication or wired communication based network NT. In some example embodiments, the plurality of computing nodes 3100 to 3400 included in the data center 3000 may be implemented by the same memory technology or may be implemented by different memory technologies.

Although not illustrated in drawing, at least a part of the plurality of computing nodes 3100 to 3400 of the data center 3000 may communicate with an external client node (not illustrated) over the network NT or over any other communication interface (not illustrated). At least a part of the plurality of computing nodes 3100 to 3400 may automatically process a request (e.g., data store or data transfer) depending on a request of the external client node or may process the request at any other computing node.

In some example embodiments, the number of computing nodes 3100 to 3400 included in the data center 3000 is exemplary, and the inventive concepts are not limited thereto. Also, in each computing node, the number of processors, the number of memories, and the number of storage devices are examples, and the inventive concepts are not limited thereto.

In some example embodiments, the plurality of computing nodes 3100 to 3400 may be the plurality of hosts described with reference to FIGS. 1 to 14, and each of the storage devices 3130 to 3430 respectively included in the plurality of computing nodes 3100 to 3400 may be a storage device configured to support a multi-host or a multi-tenant described with reference to FIGS. 1 to 14. Based on the operation method described with reference to FIGS. 1 to 14, each of the storage devices 3130 to 3430 respectively included in the plurality of computing nodes 3100 to 3400 may be configured to secure the minimum performance of each of the plurality of computing nodes 3100 to 3400 and to limit the maximum performance.

According to the inventive concepts, a storage device may secure a minimum performance of each of a plurality of hosts. In some example embodiments, the storage device may prevent a specific host from occupying a physical resource of the storage device by limiting a performance of each of the plurality of hosts to the corresponding maximum performance. Accordingly, a storage device having an improved performance and an operation method of the storage device are provided.

While the inventive concepts has been described with reference to some example embodiments thereof, it will be apparent to those of ordinary skill in the art that various changes and modifications may be made thereto without departing from the spirit and scope of the inventive concepts as set forth in the following claims.

What is claimed is:

1. A method of operation of a storage device, the storage device configured to implement a plurality of physical functions respectively corresponding to a plurality of host devices, the method comprising:
   receiving performance information from each of the plurality of host devices;
   setting a performance level of each of the plurality of physical functions to a first level;
   processing at least one command from at least a first host device of the plurality of host devices through at least a first physical function of the plurality of physical functions, the first host device corresponding to the first physical function;
   changing a performance level of the first physical function to a second level based on performance information associated with the first host device and a performance serviced to the first host device based on processing the at least one command from at least the first host device through at least the first physical function; and
   processing a second command from at least one second host device of the plurality of host devices through at least one second physical function of the plurality of physical functions prior to processing a subsequent first command from the first host device through the first physical function, based on a performance level of the at least one second physical function being the first level and the performance level of the first physical function being the second level, wherein the at least one second host device corresponds to the at least one second physical function.

2. The method of claim 1, wherein the performance information includes information indicating a minimum performance of at least the first host device of the plurality of host devices.

3. The method of claim 2, wherein the changing of the performance level of the first physical function includes
   monitoring the performance serviced to the first host device through the first physical function;
   comparing the monitored performance and the minimum performance; and
   changing the performance level of the first physical function to the second level in response to a determination, based on the comparing, that the monitored performance serviced to the first host device at least meets the minimum performance.

4. The method of claim 3, further comprising:
   changing the performance level of the first physical function from the second level to the first level in response to a determination that a subsequent performance serviced to the first host device fails to at least meet the minimum performance, subsequently to the performance level of the first physical function being changed to the second level.

5. The method of claim 1, wherein the performance information are received from each of the plurality of host devices in an initialization process.

6. The method of claim 1, further comprising:
   processing the subsequent first command from the first host device through the first physical function having the performance level that is the second level, in response to a determination that a command is absent from a submission queue of the at least one second host device corresponding to the at least one second physical function having the performance level that is the first level.

7. The method of claim 1, wherein
the performance information includes information indicating a maximum performance of the first host device, and
the method further includes
disabling the first physical function corresponding to the first host device, in response to a determination that a subsequent performance serviced to the first host device exceeds the maximum performance of the first host device.

8. The method of claim 1, wherein each of the plurality of physical functions includes a nonvolatile memory express (NVMe) controller circuitry.

9. The method of claim 1, wherein each of the plurality of physical functions is configured to communicate with one or more host devices of the plurality of host devices through at least one physical port, the at least one physical port based on a PCI-express interface.

10. A storage device, comprising:
a nonvolatile memory device; and
a storage control circuitry configured to control the nonvolatile memory device under control of a first host device and a second host device,
wherein the storage control circuitry includes
a first nonvolatile memory express (NVMe) controller circuitry configured to process a first command from a first submission queue of the first host device;
a second NVMe controller circuitry configured to process a second command from a second submission queue of the second host device; and
processing circuitry configured to
perform command scheduling on the first and second commands based on a performance level of each of the first and second NVMe controller circuitries, and
adjust the performance level of each of the first and second NVMe controller circuitries based on performance information received from the first and second host devices and performances serviced to the first and second host devices respectively through the first and second NVMe controller circuitries.

11. The storage device of claim 10, wherein the processing circuitry is further configured to
set the performance level of each of the first and second NVMe controller circuitries to a first level in an initial operation.

12. The storage device of claim 11, wherein
the performance information includes information indicating a first minimum performance of the first host device, and
the processing circuitry is configured to, in response to a determination that performance serviced to the first host device at least meets the first minimum performance of the first host device,
adjust the performance level of the first NVMe controller circuitry corresponding to the first host device from the first level to a second level, and
subsequently to the adjusting, perform subsequent command scheduling on the first and second commands based on the performance level of each of the first and second NVMe controller circuitries, where the subsequent command scheduling includes processing the second command prior to processing the first command through the second NVMe controller circuitry, based on the performance level of the second NVMe controller circuitry corresponding to the second host device being the first level and the performance level of the first NVMe controller circuitry corresponding to the first host device being the second level.

13. The storage device of claim 11, wherein
the performance information includes information indicating a first maximum performance of the first host device, and
the processing circuitry is configured to disable the first NVMe controller circuitry in response to a determination that performance serviced to the first host device exceeds the first maximum performance.

14. The storage device of claim 10, wherein the processing circuitry is configured to
perform command scheduling on the first and second commands based on the performance level of each of the first and second NVMe controller circuitries;
monitor the performance serviced to each of the first and second host devices; and
adjust the performance level of each of the first and second NVMe controller circuitries based on the performance information and the performances serviced to the first and second host devices respectively through the first and second NVMe controller circuitries.

15. The storage device of claim 10, wherein the first and second NVMe controller circuitries are configured to communicate with separate, respective host devices of the first and second host devices through at least one PCI-express interface based physical port.

16. The storage device of claim 10, wherein the first and second host devices are external computing nodes configured to communicate with the first and second NVMe controller circuitries over a network.

17. An operation method of a storage device which is configured to communicate with a plurality of host devices, the method comprising:
receiving performance information from the plurality of host devices;
performing command scheduling on one or more commands from one or more host devices of the plurality of host devices;
monitoring performances respectively serviced to the one or more host devices of the plurality of host devices, the performances being serviced based on performing the command scheduling; and
performing subsequent command scheduling on a first command from at least one first host device from the plurality of host devices and a second command from at least one second host device from the plurality of host devices such that the first command is processed prior to the second command being processed, based on the monitored performances and the performance information.

18. The method of claim 17, wherein
a first performance associated with the at least one first host device from among the monitored performances does not at least meet a first minimum performance indicated by the performance information and associated with the at least one first host device, and
a second performance associated with the at least one second host device from among the monitored performances at least meets a second minimum performance indicated by the performance information and associated with the at least one second host device.

19. The method of claim 18, further comprising:
performing command scheduling such that a command of the at least one second host device is not processed, in response to a determination that the second performance exceeds a second maximum performance indicated by the performance information and associated with the at least one second host device.

20. The method of claim 17, further comprising:
performing the subsequent command scheduling such that the second command is processed after first commands from the at least one first host device of the plurality of host devices are all processed, based on the monitored performances and the performance information.

* * * * *